(12) United States Patent
Susitaival et al.

(10) Patent No.: US 9,867,096 B2
(45) Date of Patent: Jan. 9, 2018

(54) UPLINK RECONFIGURATION FOR SPLIT BEARER IN DUAL CONNECTIVITY

(71) Applicant: Telefonaktiebolaget L M Ericsson (publ), Stockholm (SE)

(72) Inventors: Riikka Susitaival, Helsinki (FI); Torsten Dudda, Aachen (DE); Mattias Tan Bergström, Stockholm (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 207 days.

(21) Appl. No.: 14/758,408

(22) PCT Filed: Apr. 30, 2015

(86) PCT No.: PCT/SE2015/050486
§ 371 (c)(1),
(2) Date: Jun. 29, 2015

(87) PCT Pub. No.: WO2015/171053
PCT Pub. Date: Nov. 12, 2015

(65) Prior Publication Data
US 2016/0255551 A1    Sep. 1, 2016

Related U.S. Application Data

(60) Provisional application No. 61/991,304, filed on May 9, 2014.

(51) Int. Cl.
*H04W 4/00* (2009.01)
*H04W 36/04* (2009.01)
(Continued)

(52) U.S. Cl.
CPC ............ *H04W 36/04* (2013.01); *H04J 11/00* (2013.01); *H04L 61/6022* (2013.01);
(Continued)

(58) Field of Classification Search
CPC combination set(s) only.
See application file for complete search history.

(56) References Cited

U.S. PATENT DOCUMENTS 9,078,241 B2 *   7/2015   Yamada ............. H04W 76/025
2008/0188224 A1   8/2008   Pani et al.
(Continued)

FOREIGN PATENT DOCUMENTS

WO    2015047152 A1    4/2015

OTHER PUBLICATIONS

Unknown, Author, "Introduction of Dual Connectivity—Change Request", NTT Docomo, Inc., 3GPP TSG-RAN WG2 #85, R2-140906, Prague, Czech Republic, Feb. 10-14, 2014, 1-4.
(Continued)

*Primary Examiner* — Frank Duong
(74) *Attorney, Agent, or Firm* — Murphy, Bilak & Homiller, PLLC

(57) ABSTRACT

According to some embodiments, a wireless device operating in dual connectivity with a first and second network node performs a method comprising establishing an uplink radio connection from the wireless device to the first and second network nodes. The wireless device comprises first MAC and RLC modules for uplink radio communication with the first network node, second MAC and RLC modules for uplink radio communication with the second network node, and a PDCP module for communicating with the first and second RLC modules. The method further comprises communicating data for uplink transmission from the PDCP module to the first RLC module; obtaining an indication to switch transmission of uplink data from the first network node to the second network node; resetting the first RLC
(Continued)

module and the first MAC module; and communicating data for uplink transmission from the PDCP module to the second RLC module.

32 Claims, 18 Drawing Sheets

(51) Int. Cl.
    *H04W 36/02*     (2009.01)
    *H04J 11/00*     (2006.01)
    *H04L 29/12*     (2006.01)
    *H04W 16/32*     (2009.01)
    *H04W 28/02*     (2009.01)
    *H04W 36/02*     (2009.01)
    *H04W 36/30*     (2009.01)
    *H04W 72/04*     (2009.01)
    *H04W 76/04*     (2009.01)
    *H04L 1/18*     (2006.01)
    *H04W 36/00*     (2009.01)
    *H04W 88/16*     (2009.01)

(52) U.S. Cl.
    CPC ....... *H04W 16/32* (2013.01); *H04W 28/0278* (2013.01); *H04W 36/023* (2013.01); *H04W 36/30* (2013.01); *H04W 72/0413* (2013.01); *H04W 76/046* (2013.01); *H04L 1/1874* (2013.01); *H04W 36/0027* (2013.01); *H04W 88/16* (2013.01)

(56) References Cited

U.S. PATENT DOCUMENTS

| | | | |
|---|---|---|---|
| 2009/0086676 | A1 | 4/2009 | Meylan et al. |
| 2015/0098322 | A1* | 4/2015 | Chen ................ H04W 72/0413 370/230 |
| 2015/0117183 | A1* | 4/2015 | Heo ................ H04W 36/0055 370/228 |
| 2015/0173047 | A1* | 6/2015 | Yamada ............. H04W 72/042 370/329 |
| 2016/0295442 | A1* | 10/2016 | Virtej ................ H04W 72/1284 |

OTHER PUBLICATIONS

Unknown, Author, "BSR trigger with uplink bearer split", LG Electronics Inc., 3GPP TSG-RAN WG2 Meeting #85bis, R2-14xxxx, Valencia, Spain, Mar. 31-Apr. 4, 2014, 1-3.
Unknown, Author, "Introduction of dual connectivity in MAC", Change Request, Ericsson, 3GPP TSG-RAN WG2 #85bis, Tdoc R2-141550, Valencia, Spain, Mar. 31-Apr. 4, 2014, 1-44.
Unknown, Author, "Radio bearer configuration and switch in dual connectivity", Huawei, HiSilicon, 3GPP TSG RAN WG2 Meeting #85bis, R2-141163, Valencia, Spain, Mar. 31-Apr. 4, 2014, 1-5.
Unknown, Author, "Remaining issues on UL of split bearer", Ericsson, 3GPP TSG-RAN WG2 #86, Tdoc R2-142415, Seoul, South Korea, May 19-23, 2014, 1-3.
Unknown, Author, "Uplink data transmission details with split bearers", Broadcom Corporation, 3GPP TSG-RAN WG2 Meeting #85bis, R2-141666, Valencia, Spain, Mar. 31-Apr. 4, 2014, 1-3.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.4.0, Dec. 2012, 1-208.
3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.5.0, Mar. 2015, 1-77.
3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.5.0, Mar. 2015, 1-445.

* cited by examiner

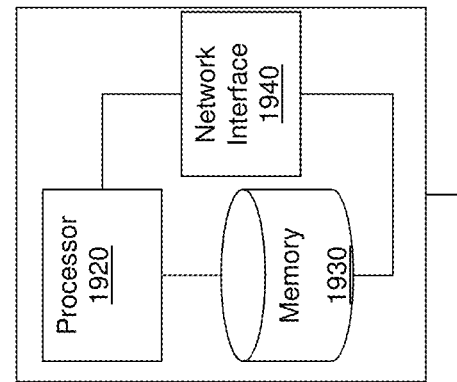
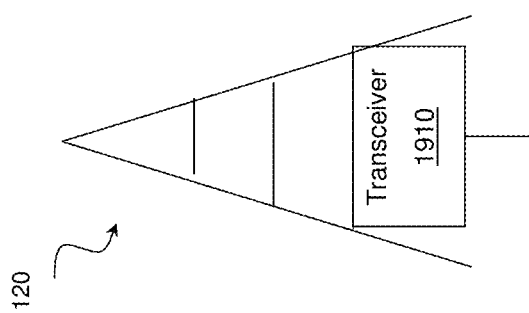
Fig. 19
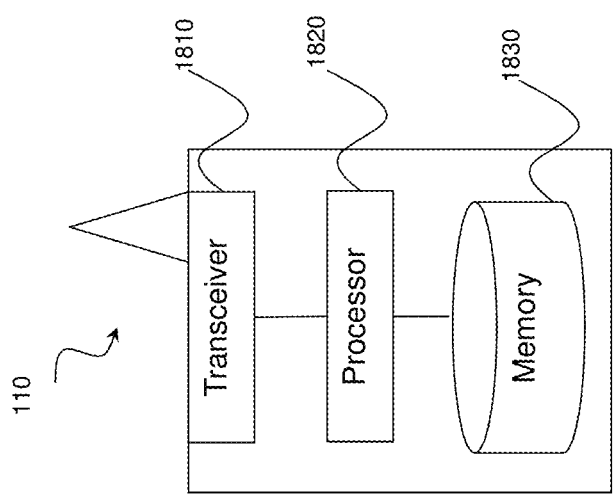
Fig. 18

UPLINK RECONFIGURATION FOR SPLIT BEARER IN DUAL CONNECTIVITY

TECHNICAL FIELD

Particular embodiments are directed to wireless communications and, more particularly, to uplink reconfiguration for split bearer in dual connectivity.

BACKGROUND

In a typical cellular radio system, wireless terminals (also referred to as user equipment unit nodes, UEs, mobile terminals, wireless devices, and/or mobile stations) communicate via a radio access network (RAN) with one or more core networks, which provide access to data networks, such as the Internet, and/or the public-switched telecommunications network (PSTN). The RAN covers a geographical area that is divided into cell areas, with each cell area being served by a radio base station (also referred to as a network node, base station, a RAN node, a "NodeB", and/or enhanced NodeB "eNodeB"). A cell area is a geographical area where radio coverage is provided by the base station equipment at a base station site. The base stations communicate through radio communication channels with wireless terminals within range of the base stations.

Cellular communications system operators have begun offering mobile broadband data services based on, for example, WCDMA (Wideband Code Division Multiple Access), HSPA (High Speed Packet Access), and Long Term Evolution (LTE) wireless technologies. Moreover, fuelled by introduction of new devices designed for data applications, end user performance requirements are steadily increasing. The increased adoption of mobile broadband has resulted in significant growth in traffic handled by high-speed wireless data networks. Accordingly, techniques that allow cellular operators to manage networks more efficiently are desired.

Techniques to improve downlink performance may include 4-branch Multiple-Input Multiple-Output (MIMO), multi-flow communication, multi-carrier deployment, etc. Since spectral efficiencies per link may be approaching theoretical limits, next steps may include improving spectral efficiencies per unit area. Further efficiencies for wireless networks may be achieved, for example, by changing a topology of traditional networks to provide increased uniformity of user experiences throughout a cell.

A homogeneous network is a network of base stations in a planned layout, providing communications services for a collection of wireless terminals in which all base stations may have similar transmit power levels, antenna patterns, receiver noise floors, and/or backhaul connectivity to the data network. Moreover, all base stations in a homogeneous network may offer unrestricted access to wireless terminals in the network, and each base station may serve roughly a same number of wireless terminals. Current cellular wireless communications systems in this category may include, for example, Global System for Mobile communication (GSM), WCDMA, High Speed Downlink Packet Access (HSDPA), LTE, Worldwide Interoperability for Microwave Access (WiMAX), etc.

In a heterogeneous network, low power base stations (also referred to as low power nodes, LPNs, micro nodes, pico nodes, femto nodes, relay nodes, remote radio unit nodes, RRU nodes, small cells, RRUs, etc.) may be deployed along with or as an overlay to planned and/or regularly placed macro base stations. A macro base station (MBS) may thus provide service over a relatively large macro cell area and each LPN may provide service for a respective relatively small LPN cell area within the relatively large macro cell area. Power transmitted by an LPN (e.g., 2 Watts) may be relatively small compared to power transmitted by a macro base station (e.g., 40 Watts for a typical macro base station). An LPN may be deployed, for example, to reduce/eliminate a coverage hole(s) in the coverage provided by the macro base stations, and/or to off-load traffic from macro base stations (e.g., to increase capacity in a high traffic location, also referred to as a hot-spot). Due to the lower transmit power and smaller physical size, an LPN may offer greater flexibility for site acquisition.

In initial discussions among members of the $3^{rd}$-Generation Partnership Project (3GPP) regarding the development of Release 12 specifications for LTE, one of the proposed items for study is the possibility of simultaneously serving a UE from more than one eNB, referred to as "dual connectivity." The control and user plane procedures of LTE may be updated to support dual connectivity.

SUMMARY

According to some embodiments, a wireless device operating in dual connectivity with a first network node and a second network node performs a method comprising establishing an uplink radio connection from the wireless device to the first network node and to the second network node. The wireless device comprises a first Medium Access Control (MAC) module and a first Radio Link Control (RLC) module for uplink radio communication with the first network node, a second MAC module and a second RLC module for uplink radio communication with the second network node, and a Packet Data Convergence Protocol (PDCP) module for communicating with the first RLC module and the second RLC module. The method further comprises communicating data for uplink transmission from the PDCP module to the first RLC module; obtaining an indication to switch transmission of uplink data from the first network node to the second network node; resetting the first RLC module and the first MAC module; and communicating data for uplink transmission from the PDCP module to the second RLC module.

In particular embodiments, the method further comprises transmitting a Buffer Status Report (BSR). In particular embodiments, transmitting the BSR comprises transmitting a first BSR to the first network node, the first BSR indicating that the wireless device does not have data for uplink transmission to the first network node. In particular embodiments, transmitting the BSR comprises transmitting a second BSR to the second network node, the second BSR indicating that the wireless device has data for uplink transmission to the second network node.

According to some embodiments, a wireless device operating in dual connectivity with a first network node and a second network node performs a method comprising establishing an uplink radio connection from the wireless device to the first network node and to the second network node. The wireless device comprises a first MAC module and a first RLC module for uplink radio communication with the first network node, a second MAC module and a second RLC module for uplink radio communication with the second network node, and a PDCP module for communicating with the first RLC module and the second RLC module. The method further comprises communicating data for uplink transmission from the PDCP module to the first RLC module; obtaining an indication to switch transmission of uplink data from the first network node to the second network node; and communicating the data pending for uplink transmission in the first RLC module and the first MAC module to the first network node. The method further comprises communicating data pending for uplink transmission in the PDCP module to the second network node.

According to some embodiments, a first network node operating in dual connectivity with a wireless device and a second network node performs a method comprising establishing an uplink radio connection from the wireless device to the first network node and to the second network node. The wireless device comprises a first MAC module and a first RLC module for uplink radio communication with the first network node, a second MAC module and a second RLC module for uplink radio communication with the second network node, and a PDCP module for communicating with the first RLC module and the second RLC module. The method further comprises communicating, to the wireless device, an indication to switch transmission of uplink data from the first network node to the second network node; and communicating, to the wireless device, a configuration parameter for switching transmission of uplink data.

Particular embodiments may exhibit some of the following technical advantages. In dual connectivity, a UE's split bearer uplink may be connected to one of two eNBs. Under some conditions, one eNB may be preferable over the other eNB (e.g., minimizing latency or path loss). Particular embodiments facilitate reconfiguration of a UEs split bearer uplink to switch from one eNB to another. In particular embodiments, a UE may send BSRs to efficiently update an eNB about the UEs uplink configuration.

BRIEF DESCRIPTION OF THE DRAWINGS

For a more complete understanding of particular embodiments and their features and advantages, reference is now made to the following description, taken in conjunction with the accompanying drawings, in which:

FIG. 18 is a block diagram illustrating an example embodiment of a wireless device; and FIG. 19 is a block diagram illustrating an example embodiment of a network node.

DETAILED DESCRIPTION

Figure 1:
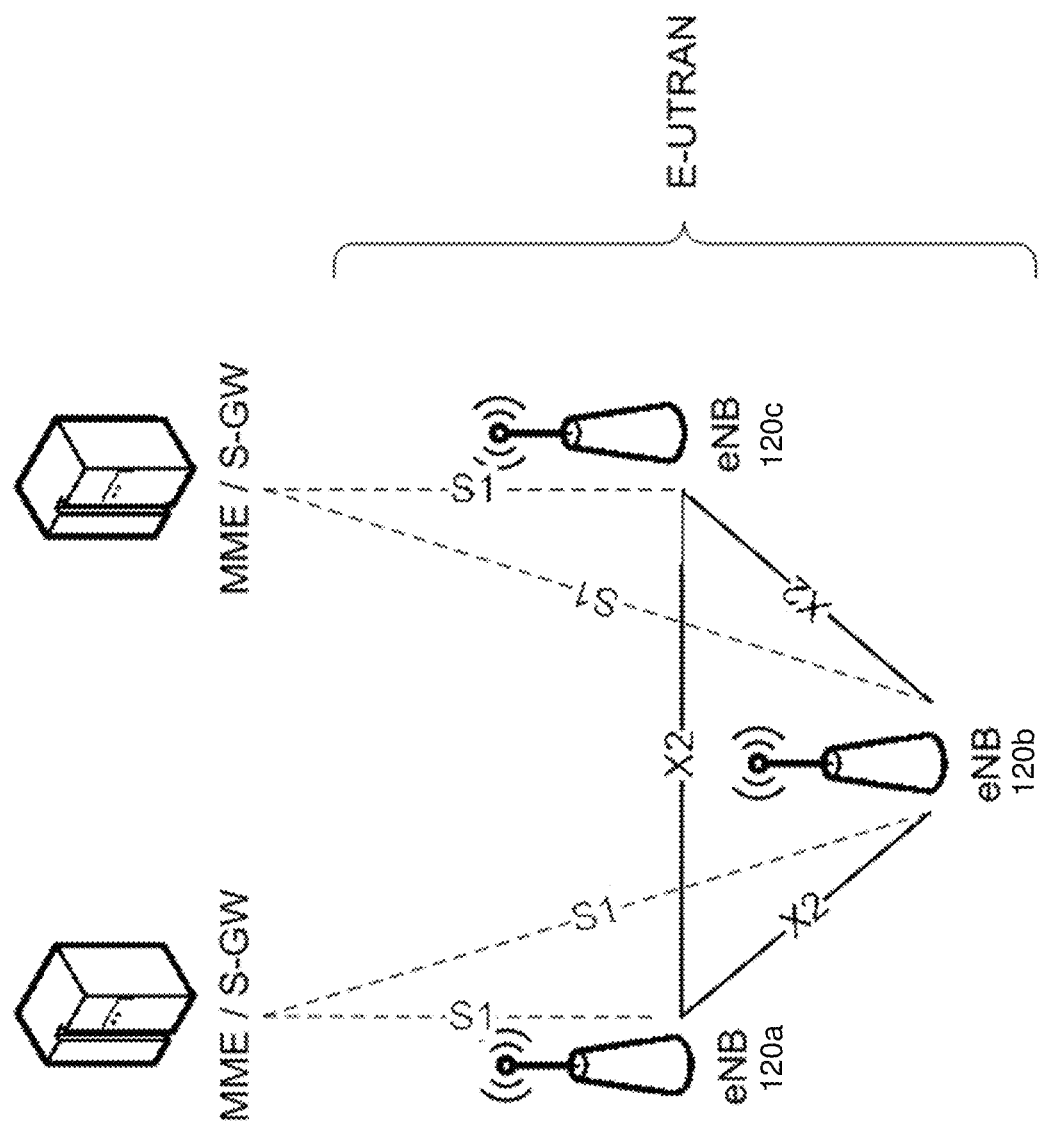
FIG. 1 is a schematic/block diagram illustrating an example Evolved Universal Terrestrial Radio Access Network (E-UTRAN) architecture.

Particular embodiments will now be described more fully with reference to the accompanying drawings, however, other embodiments may include many different forms and should not be construed as limited to the examples set forth herein. Embodiments of the disclosure need not be mutually exclusive, and components described with respect to one embodiment may be used in another embodiment.

For purposes of illustration and explanation only, particular embodiments are described in the context of operating in a RAN that communicates over radio communication channels with wireless terminals (also referred to as wireless devices or UEs). It will be understood, however, any suitable type of communication network could be used. As used herein, a wireless terminal or UE can include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

In some embodiments of a RAN, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without a separate RNC(s) in between, for example, with functionality of an RNC implemented at base stations and/or core networks.

The Universal Mobile Telecommunications System (UMTS) is a third generation mobile communication system, which evolved from GSM, and is intended to provide improved mobile communication services based on WCDMA technology. UTRAN, short for UMTS Terrestrial Radio Access Network, is a collective term for the Node B's and Radio Network Controllers which make up the UMTS radio access network. Thus, UTRAN is essentially a radio access network using WCDMA for UEs.

The 3GPP has undertaken to further evolve the UTRAN and GSM based radio access network technologies. In this regard, specifications for the Evolved Universal Terrestrial Radio Access Network (E-UTRAN) are ongoing within 3GPP. E-UTRAN comprises LTE and System Architecture Evolution (SAE).

LTE is a variant of a 3GPP radio access technology wherein the radio base station nodes are connected directly to a core network rather than to RNC nodes. In general, in LTE the functions of a RNC node are performed by the radio base station nodes. Thus, the RAN of an LTE system has an essentially "flat" architecture comprising radio base station nodes without reporting to RNC nodes.

Note that although certain terminology from 3GPP LTE is used in some example embodiments, this should not be seen as limiting. Other wireless systems, such as WCDMA, HSPA, WiMAX, Ultra Mobile Broadband (UMB), HSDPA, GSM, etc., may be used in other embodiments.

Also note that terminology such as base station (also referred to as NodeB, eNodeB, Evolved Node B, or network node) and wireless terminal (also referred to as User Equipment node, UE, or wireless device) should be considering non-limiting and does not imply a certain hierarchical relation between the two. In general, a base station and a wireless terminal may be considered as examples of respective different communications devices that communicate with each other over a wireless radio channel. While embodiments discussed herein may focus on wireless transmissions in an uplink from a UE to a NodeB, embodiments of the disclosed concepts may also be applied, for example, in a downlink. Furthermore, the described techniques may be applied in any suitable type of network, including both homogeneous and heterogeneous configurations. Thus, the base stations involved in the described configurations may be similar or identical to one another, or may differ in terms of transmission power, number of transmitter-receiver antennas, processing power, receiver and transmitter characteristics, and/or any other functional or physical capability.

With the proliferation of user friendly smart phones and tablets, the usage of high data rate services such as video streaming over the mobile network is becoming commonplace, greatly increasing the amount of traffic in mobile networks. Thus, there is a need in the mobile network community to ensure that the capacity of mobile networks keeps up with this ever-increasing user demand. The latest systems such as LTE, especially when coupled with interference mitigation techniques, have spectral efficiencies very close to the theoretical Shannon limit. The continuous upgrading of current networks to support the latest technologies and densifying the number of base stations per unit area are two of the most widely used approaches to meet the increasing traffic demands.

Yet another approach that is gaining high attention is to use heterogeneous networks where the traditional pre-planned macro base stations (known as the macro layer) are complemented with several low-powered base stations that may be deployed in a relatively unplanned manner. The 3GPP has incorporated the concept of heterogeneous networks as one of the core items of study in the latest enhancements of LTE, such as LTE Release 11, and several low-powered base stations to realize heterogeneous networks such as pico base stations, femto base stations (also known as home base stations or HeNBs), relays, and RRHs (remote radio heads) have been defined.

A proposed item for study in LTE Release 12 is the possibility of serving a UE from more than one eNB simultaneously. Current handover mechanisms of LTE may have to be updated to support this.

Particular embodiments are described with reference to FIGS. 1-19 of the drawings, like numerals being used for like and corresponding parts of the various drawings. LTE is used throughout this disclosure as an example cellular system, but the ideas presented herein apply to other wireless communication systems as well.

FIG. 1 is a schematic/block diagram illustrating an example E-UTRAN architecture. The E-UTRAN includes eNBs 120 that provide the E-UTRAN user plane and control plane protocol terminations towards a UE (not illustrated). The eNBs 120 are interconnected with each other using the X2 interface. The eNBs 120 are also connected using the S1 interface to the EPC, and more specifically to the MME (Mobility Management Entity) by means of the S1-MME interface and to the Serving Gateway (S-GW) by means of the S1-U interface. The S1 interface supports many-to-many relation between MMEs/S-GWs and eNBs 120.

The eNB 120 hosts functionalities such as Radio Resource Management (RRM), radio bearer control, admission control, header compression of user plane data towards the serving gateway, and/or routing of user plane data towards the serving gateway. The MME is the control node that processes the signaling between the UE and the core network. Significant functions of the MME are related to connection management and bearer management, which are handled via Non Access Stratum (NAS) protocols. The S-GW is the anchor point for UE mobility, and also includes other functionalities such as temporary downlink data buffering while the UE is being paged, packet routing and forwarding to the right eNB, and/or gathering of information for charging and lawful interception. The PDN Gateway (P-GW) is the node responsible for UE IP address allocation, as well as Quality of Service (QoS) enforcement (as further discussed below).

Figure 2:
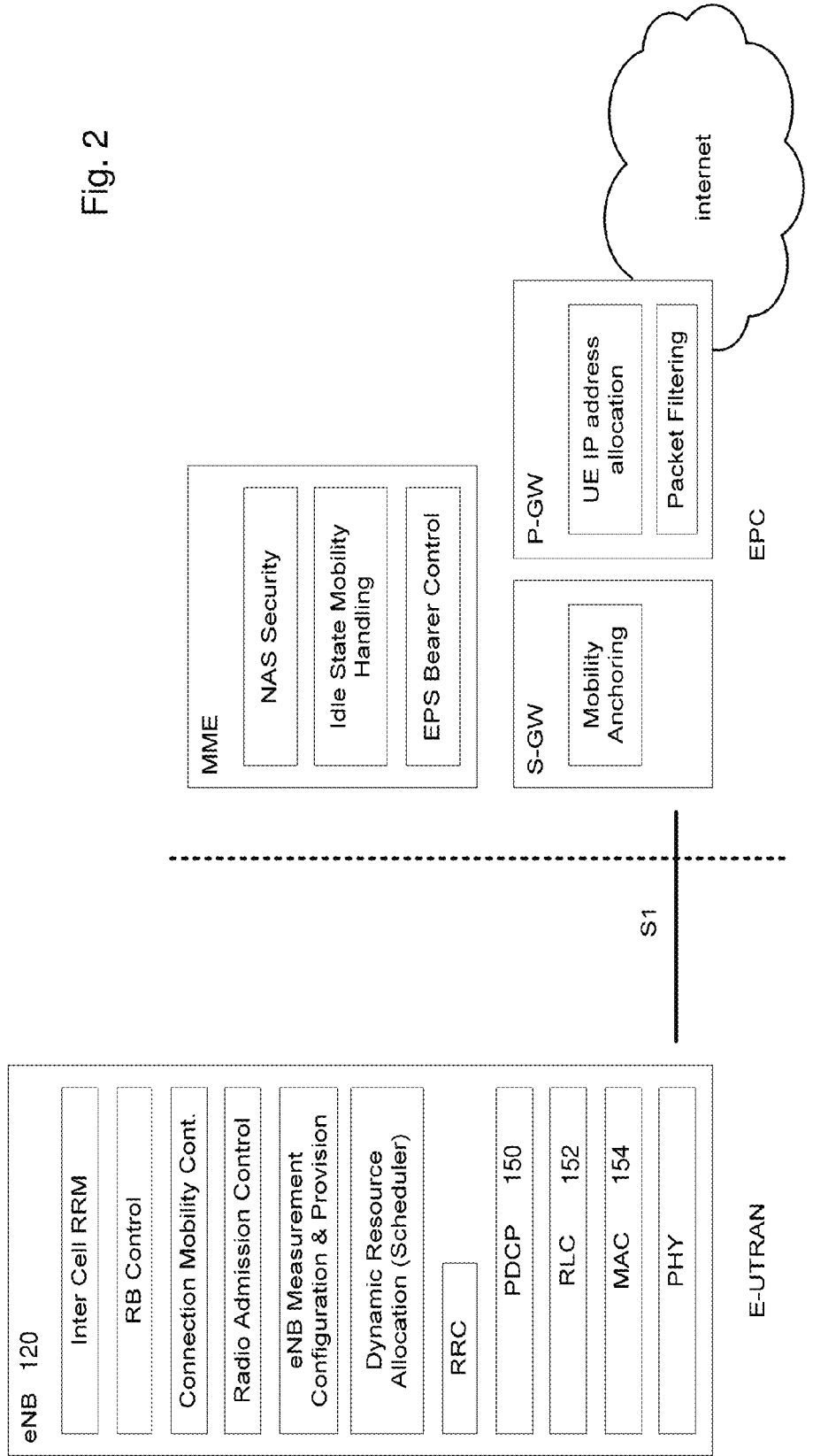
FIG. 2 is an example block diagram illustrating a functional split between E-UTRAN and the Evolved Packet Core (EPC)

FIG. 2 is an example block diagram illustrating a functional split between E-UTRAN and the EPC. FIG. 2 summarizes functionalities of the different nodes (see 3GPP TS 36.300 and the references therein for further details of functionalities of the different nodes). Blocks eNB 120, MMe, S-GW, and P-GW illustrate logical nodes. Blocks Inter Cell RRM, RB Control, Connection Mobility Cont., Radio Admission Control, eNB Measurement Configuration & Provision, Dynamic Resource Allocation (Scheduler), NAS Security, Idle State Mobility Handling, EPS bearer Control, Mobility Anchoring, UE IP address allocation, and Packet Filtering illustrate functional entities of the control plane. Blocks RRC, PDCP 150, RLC 152, MAC 154, and PHY illustrate the radio protocol layers. The radio protocol architecture of E-UTRAN is divided into the user plane and the control plane.

Figure 3:
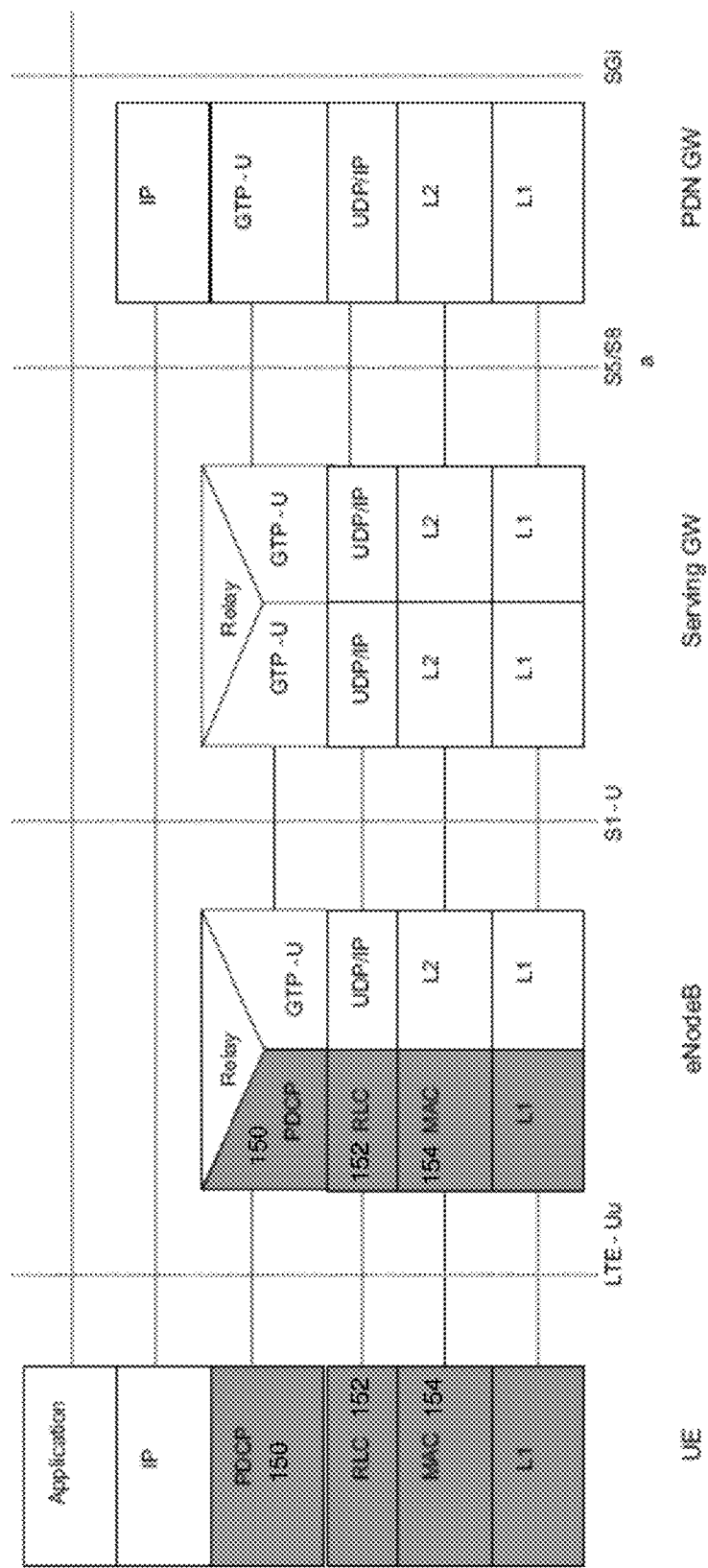
FIG. 3 is a schematic diagram illustrating an example user plane protocol stack.

FIG. 3 is a schematic diagram illustrating an example user plane protocol stack. The user plane protocol stack includes the Packet Data Convergence Protocol (PDCP) 150, Radio Link Control (RLC) 152, and Medium Access Control (MAC) 154, which are terminated at eNB 120. PDCP 150 manages IP packets in the user plane and it performs functionalities such as header compression, security, and re-ordering and retransmission during handover. RLC 152 is responsible for segmentation (and corresponding assembly) of PDCP packets, so that they fit the size that is actually to be transmitted over the air interface. RLC 152 can operate either in unacknowledged mode or acknowledged mode, where the latter supports retransmissions. MAC 154 performs multiplexing of data from different radio bearers, and it informs RLC 152 about the size of the packets to provide, which is decided based on the QoS of each radio bearer and the current capacity available to the UE.

Figure 4:
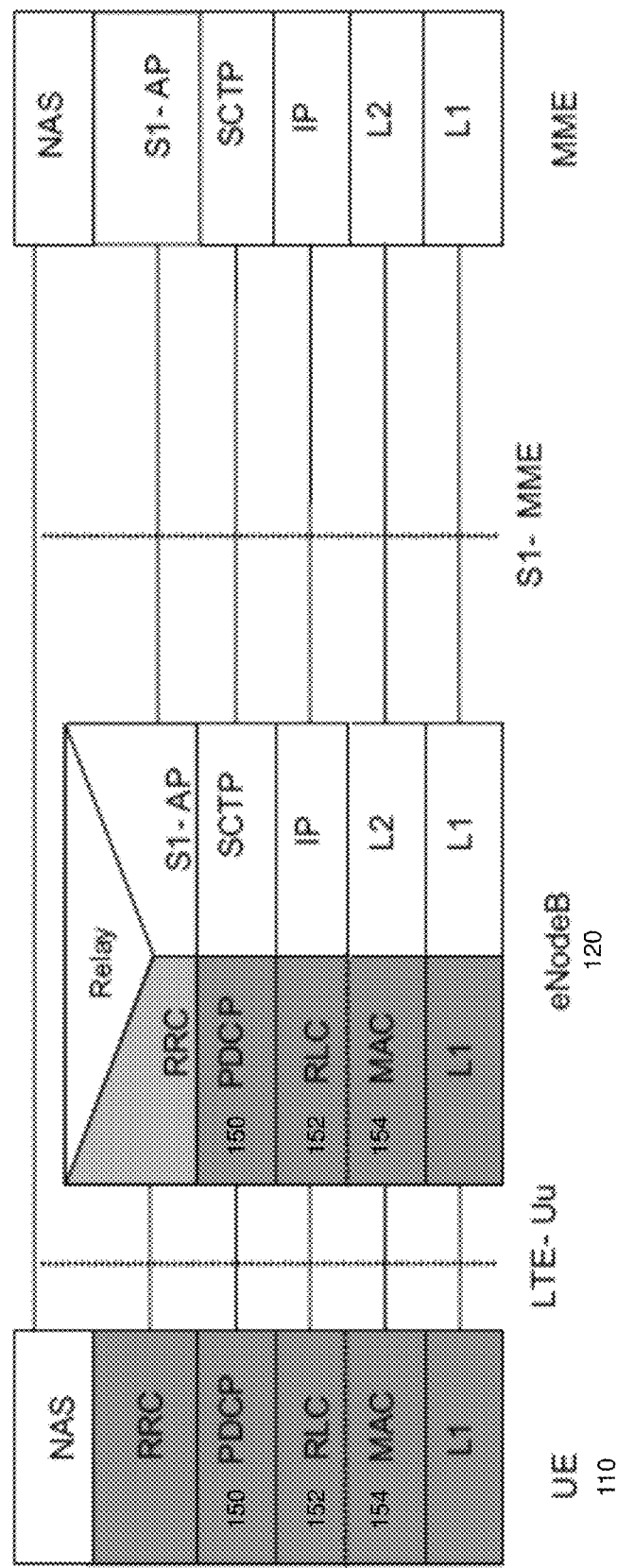
FIG. 4 is a schematic diagram illustrating an example control plane protocol stack.

FIG. 4 is a schematic diagram illustrating an example control plane protocol stack. The layers below the Radio Resource Control (RRC) layer perform the same functionality as in the user plane, except that there is no header compression in the control plane. The main functions of the RRC are the broadcasting of system information, RRC connection control (establishment, modification, and release of RRC connection, establishment of signaling radio bearers (SRB) and data radio bearers (DRBs), handover, configuration of lower protocol layers, radio link failure recovery, etc.), and measurement configuration and reporting. Details of the RRC protocol functionalities and procedures can be found in 3GPP TS 36.331.

A UE is uniquely identified over the S1 interface within an eNB with the eNB UE S1AP ID. When an MME receives an eNB UE S1AP ID, the MME stores it for the duration of the UE-associated logical S1-connection for this UE. Once known to an MME, this IE (information element) is included in all UE-associated S1-AP signaling. The eNB UE S1AP ID is unique within the eNB, and a UE is assigned a new S1AP ID after a handover by the target eNB.

From the MME side, a UE is uniquely identified using the MME UE S1AP ID. When an eNB receives MME UE S1AP ID, the eNB stores it for the duration of the UE-associated logical S1 connection for this UE. Once known to an eNB, this IE is included in all UE-associated S1-AP signaling. The MME UE S1AP ID is unique within the MME, and it is changed if the UE's MME changes (for example, handover between two eNBs connected to different MMEs).

Figure 5:
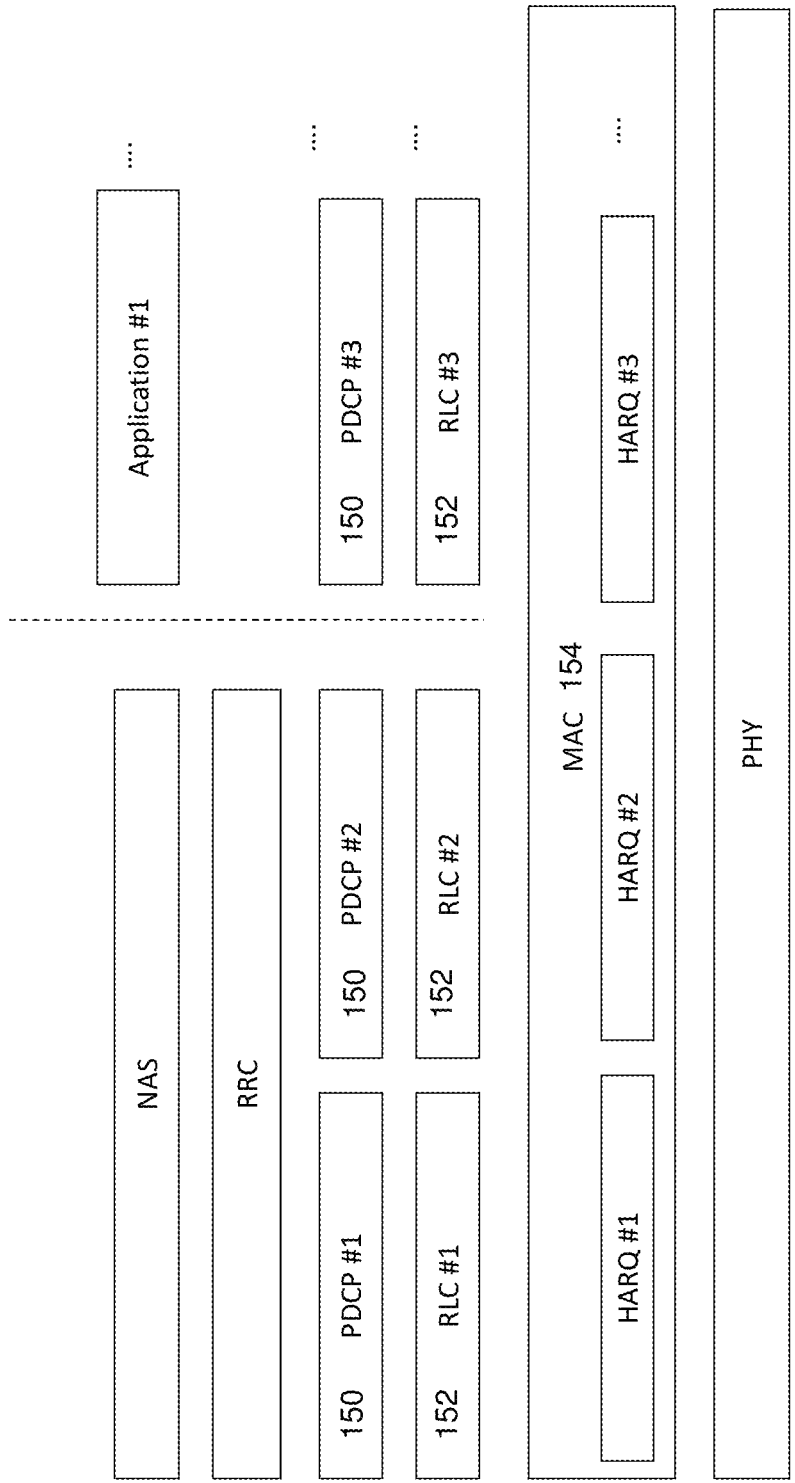
FIG. 5 is a block diagram illustrating example user plane and control plane data flows.

FIG. 5 is a block diagram illustrating example user plane and control plane data flows. There is only one MAC 150 entity per UE (unless the UE supports multiple carriers in the case of carrier aggregation), and under this MAC 150 entity several Hybrid ARQ (HARQ) processes might be running simultaneously, for rapid retransmissions. There is a separate RLC 152 entity for each radio bearer and if the radio bearer is configured to use PDCP 150, there is also one separate PDCP 150 entity for that bearer. A bearer is configured to use PDCP only if it is dedicated to a UE. In other words, multicast and broadcast data do not utilize PDCP both in the control and user plane, and the PDCP is used only for dedicated control message in the control plane and for dedicated uplink/downlink data in the user plane.

At the transmitting side, each layer receives a Service Data Unit (SDU) from a higher layer, and sends a Protocol Data Unit (PDU) to the lower layer. For example, PDCP PDUs are sent towards the RLC, and they are RLC SDUs from RLC point of view, which in turn sends RLC PDUs towards the MAC, which are MAC SDUs from the MAC point of view. At the receiving end, the process is reversed (i.e., each layer passing SDUs to the layer above it, where they are perceived as PDUs).

A UE can have multiple applications running at the same time, each having different QoS requirements (e.g., VoIP, browsing, file download, etc.). To support these different requirements, different bearers are set up, each being associated with a respective QoS. An Evolved Packet System (EPS) bearer/E-RAB (Radio Access Bearer) is the level of granularity for bearer level QoS control in the EPC/E-UTRAN. That is, Service Data Flows (SDF) mapped to the same EPS bearer receive the same bearer level packet forwarding treatment (e.g. scheduling policy, queue management policy, rate shaping policy, RLC configuration, etc.).

One EPS bearer/E-RAB is established when the UE connects to a PDN (Packet Data Network), and that remains established throughout the lifetime of the PDN connection to provide the UE with always-on IP connectivity to that PDN. That bearer is referred to as the default bearer. Any additional EPS bearer/E-RAB that is established to the same PDN is referred to as a dedicated bearer. The initial bearer level QoS parameter values of the default bearer are assigned by the network, based on subscription data. The decision to establish or modify a dedicated bearer is taken by the EPC, and the bearer level QoS parameter values are assigned by the EPC.

The packets of an EPS bearer are transported over a radio bearer between the UE and eNB. An S1 bearer transports the packets of an EPS bearer between the eNB and S-GW. An E-RAB is actually a concatenation of these two bearers (i.e., radio bearer and S1 bearer), and the two bearers are mapped in a one-to-one fashion. An S5/S8 bearer transports the packets of the EPS bearer between the S-GW and P-GW and completes the EPS bearer. There is also a one-to-one mapping between the E-RAB and S5/S8 bearer.

Figure 6:
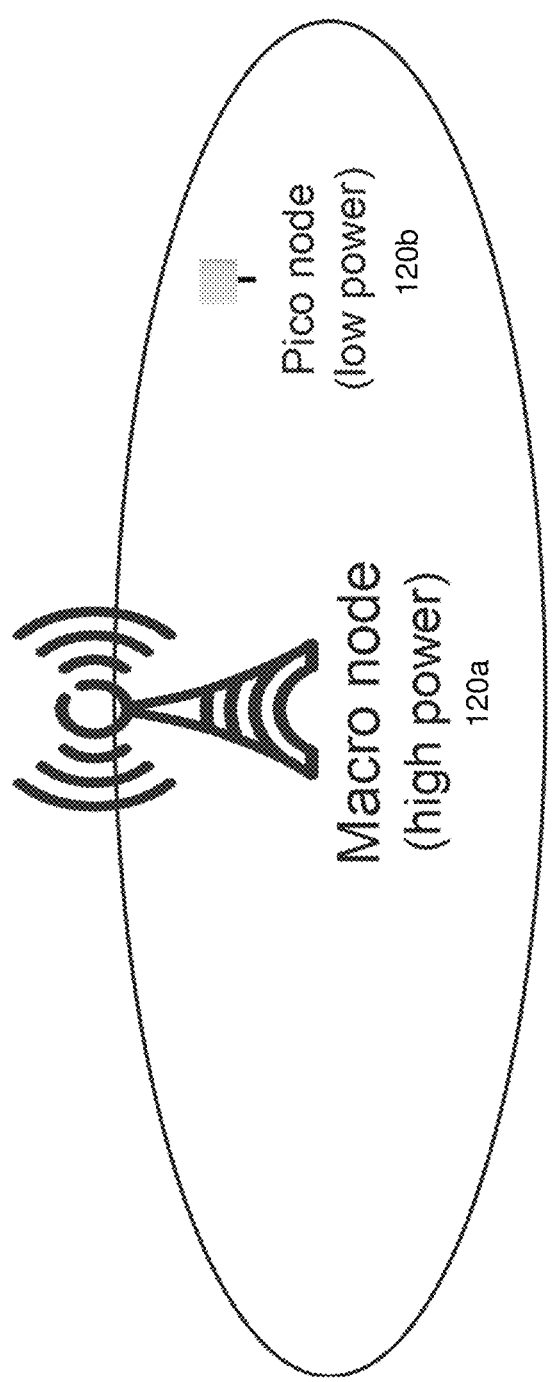
FIG. 6 is a schematic diagram illustrating an example heterogeneous deployment with a higher-power macro node and a lower-power pico node.

A heterogeneous network includes network nodes that may operate with different power levels within overlapping coverage areas. FIG. 6 illustrates an example heterogeneous network.

FIG. 6 is a schematic diagram illustrating an example heterogeneous deployment with a higher-power macro node and a lower-power pico node. FIG. 6 includes network nodes 120 (e.g., micro and pico nodes or base stations) operating with different transmit powers and with overlapping coverage areas. A heterogeneous deployment/network is a cellular network deployment strategy in which low-power nodes ("pico nodes") are typically assumed to offer high data rates (Mbit/s) and/or to provide increased/high capacity (users/m2 or Mbit/s/m2) in the local areas where increased data rates/capacity is/are needed/desired, while the high-power nodes ("macro nodes") are assumed to provide full-area coverage.

In practice, the macro nodes may correspond to currently deployed macro cells while the pico nodes are later deployed nodes, provided to extend capacity and/or achievable data rates within the macro-cell coverage area where needed/desired. FIG. 6 illustrates a heterogeneous deployment with higher-power macro node 120a and a lower-power pico node 120b. In particular embodiments, the coverage area of a macro node 120a may include multiple pico nodes 120b.

Figure 7:
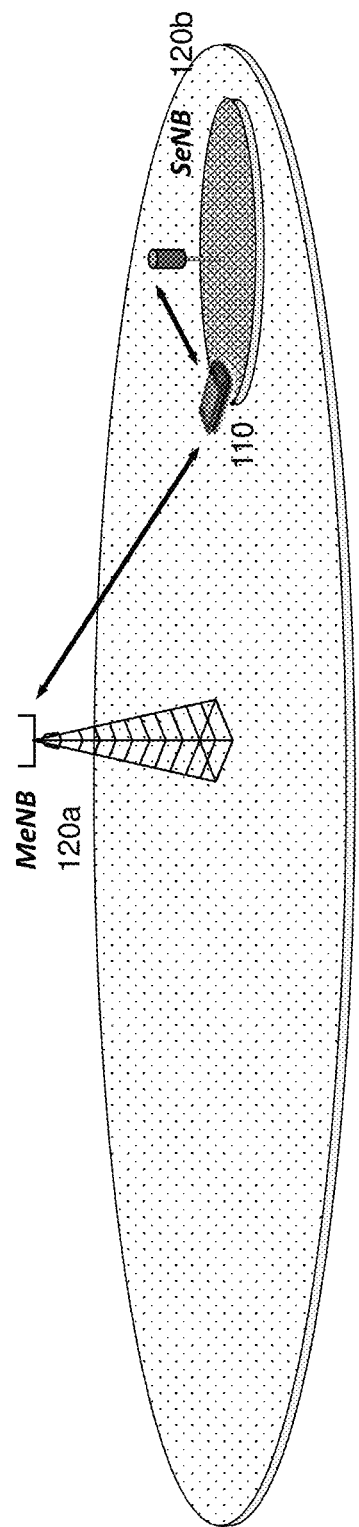
FIG. 7 is a schematic diagram illustrating an example heterogeneous deployment with dual connectivity operation.

FIG. 7 is a schematic diagram illustrating an example heterogeneous deployment with dual connectivity operation. In dual connectivity, the UE (wireless terminal) has multiple connections with both the master (macro) and secondary (pico) nodes. As illustrated, wireless device 110 is in dual connectivity with master network node 120a and secondary network node 120b.

This example may be referred to as "dual connectivity" operation because the UE consumes radio resources provided by at least two different network points connected with non-ideal backhaul. Furthermore, each eNB involved in dual connectivity for a UE may assume different roles, which are not necessarily dependent on the eNB's power class (macro or pico in this example) and may vary among UEs.

To support multiple connectivities to micro and pico nodes, several architectural options are possible both for the control and user planes. For the user plane, a centralized approach may be considered where the PDCP layer is terminated at the master node and the RLC layer (and/or the MAC layer) is terminated at the secondary node. In a decentralized approach, the PDCP layer is terminated at the secondary node.

Different options exist for control plane termination for dual connectivity. In one option, the UE has one single RRC entity, which communicates with a single RRC entity located in the MeNB on the network side, as illustrated in FIG. 8.

Figure 8:
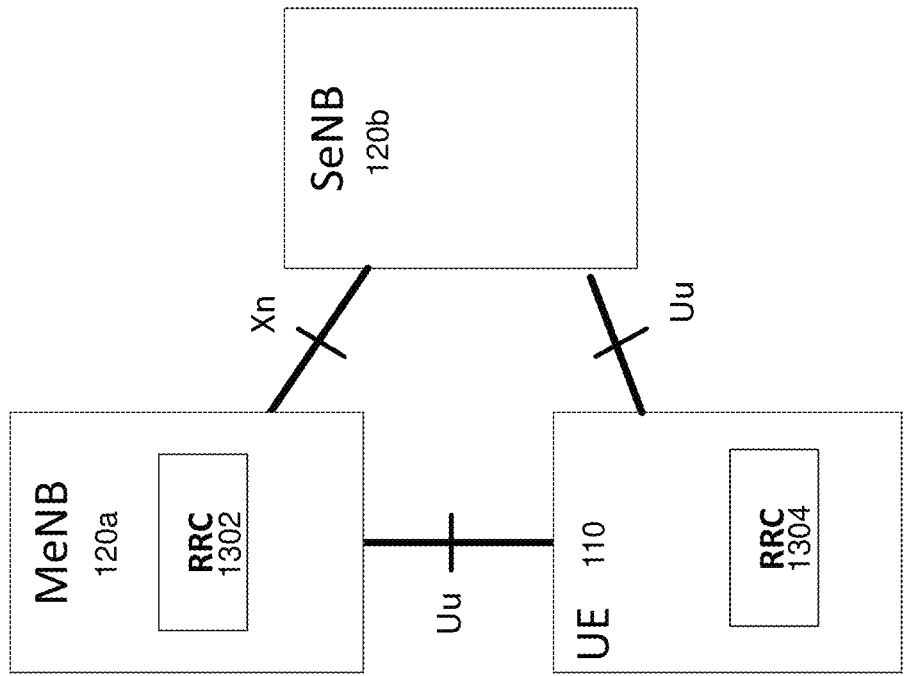
FIG. 8 is a schematic diagram illustrating example control plane termination for dual connectivity.

FIG. 8 is a schematic diagram illustrating example control plane termination for dual connectivity. MeNB 120*a* comprises RRC module 1302 and UE 110 comprises RRC module 1304. In this example, all control signaling between UE 110 and the network terminates in MeNB 120*a*. Only MeNB 120*a* generates the final RRC messages to be sent towards UE 110 after coordination of RRM functions between MeNB 120*a* and SeNB 120*b*. UE RRC module 1304 sees messages coming from one entity (e.g., MeNB 120*a*), and UE 110 replies back to that entity.

One example of dual connectivity is described above with respect to heterogeneous networks in FIG. 7. More generally, dual connectivity may be defined from a UE perspective wherein a UE simultaneously receives and transmits to at least two different network points. Dual connectivity is a feature being standardized within the umbrella work of small cell enhancements within LTE Release 12.

Dual connectivity may include aggregated network points that operate on the same frequency or in separate frequencies. LTE Release 12 describes deployments on separate frequencies. Furthermore, Release 12 assumes that a UE is capable of simultaneously receiving and transmitting from two different nodes.

Dual connectivity shares similarities with carrier aggregation and CoMP. A differentiating factor, however, is that dual connectivity is designed considering a relaxed backhaul and less stringent requirements on synchronization between the network points. This is in contrast to carrier aggregation and CoMP, wherein, before Release 12, tight synchronization and a low-delay backhaul were assumed between connected network points.

Figure 9:
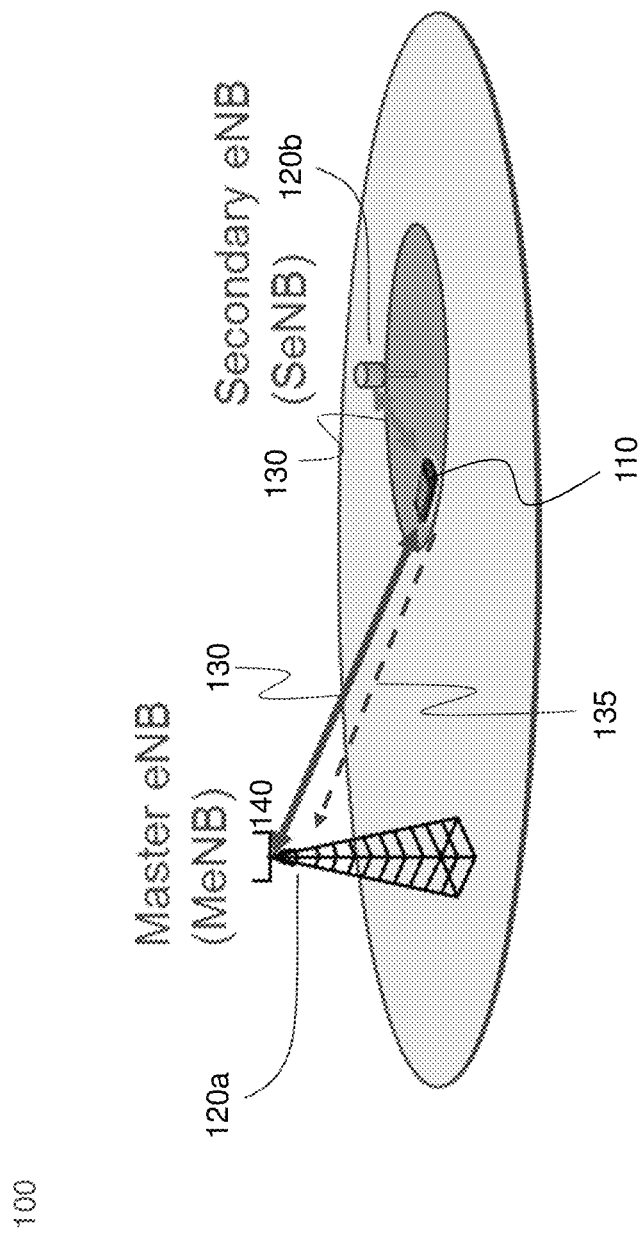
FIG. 9 illustrates an example of dual connectivity operation with the UE having multiple connections with both the MeNB and SeNB, according to some embodiments.

FIG. 9 illustrates an example of dual connectivity operation with the UE having multiple connections with both the MeNB and SeNB, according to some embodiments. Wireless network 100 includes one or more wireless devices 110 (such as mobile phones, smart phones, laptop computers, tablet computers, MTC devices, or any other devices that can provide wireless communication) and a network node 120 (such as a base station or eNodeB). A wireless device 110 may also be referred to as a user equipment or UE. Network node 120 serves a particular coverage area or cell.

In general, wireless devices 110 that are within coverage of network node 120 communicate with network node 120 by transmitting and receiving wireless signals 130. For example, wireless devices 110 and network node 120 may communicate wireless signals 130 containing voice traffic, data traffic, and/or control signals. Wireless signals may include both downlink transmissions (from network node 120 to wireless devices 110) and uplink transmissions 135 (from wireless devices 110 to network node 120). Uplink transmission 135 may also be referred to as uplink radio connection 135. A network node 120 communicating voice traffic, data traffic, and/or control signals to wireless device 110 may be referred to as a serving network node 120 for the wireless device 110.

Network node 120 transmits and receives wireless signals 130 using antenna 140. In particular embodiments, network node 120 may comprise multiple antennas 140. For example, network node 120 may comprise a multi-input multi-output (MIMO) system with two, four, or eight antennas 140.

In particular embodiments, wireless device 110 in dual connectivity maintains simultaneous connections to network node 120*a*, also referred to as Master eNB or MeNB, and network node 120*b*, also referred to as Secondary eNB or SeNB. MeNB 120*a* terminates the control plane connection towards wireless device 110 and is thus the controlling node of wireless device 110.

In addition to MeNB 120*a*, wireless device 110 may be connected to one or several SeNBs for added user plane support. The MeNB and SeNB roles are defined from a UE point of view. This means that an eNB that acts as a MeNB to one UE may act as SeNB to another UE. In LTE Release 12, the number of SeNBs is limited to one, however more SeNBs may be supported in future releases.

In network 100, each radio network node 120 may use any suitable radio access technology, such as LTE, LTE-Advanced, UMTS, HSPA, GSM, CDMA2000, WiMAX, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 18 below. Similarly, a radio network node may include any suitable combination of hardware and/or software. For example, in particular embodiments, a radio network node, such as radio network node 120, may include the components described with respect to FIG. 19 below.

Figure 10:
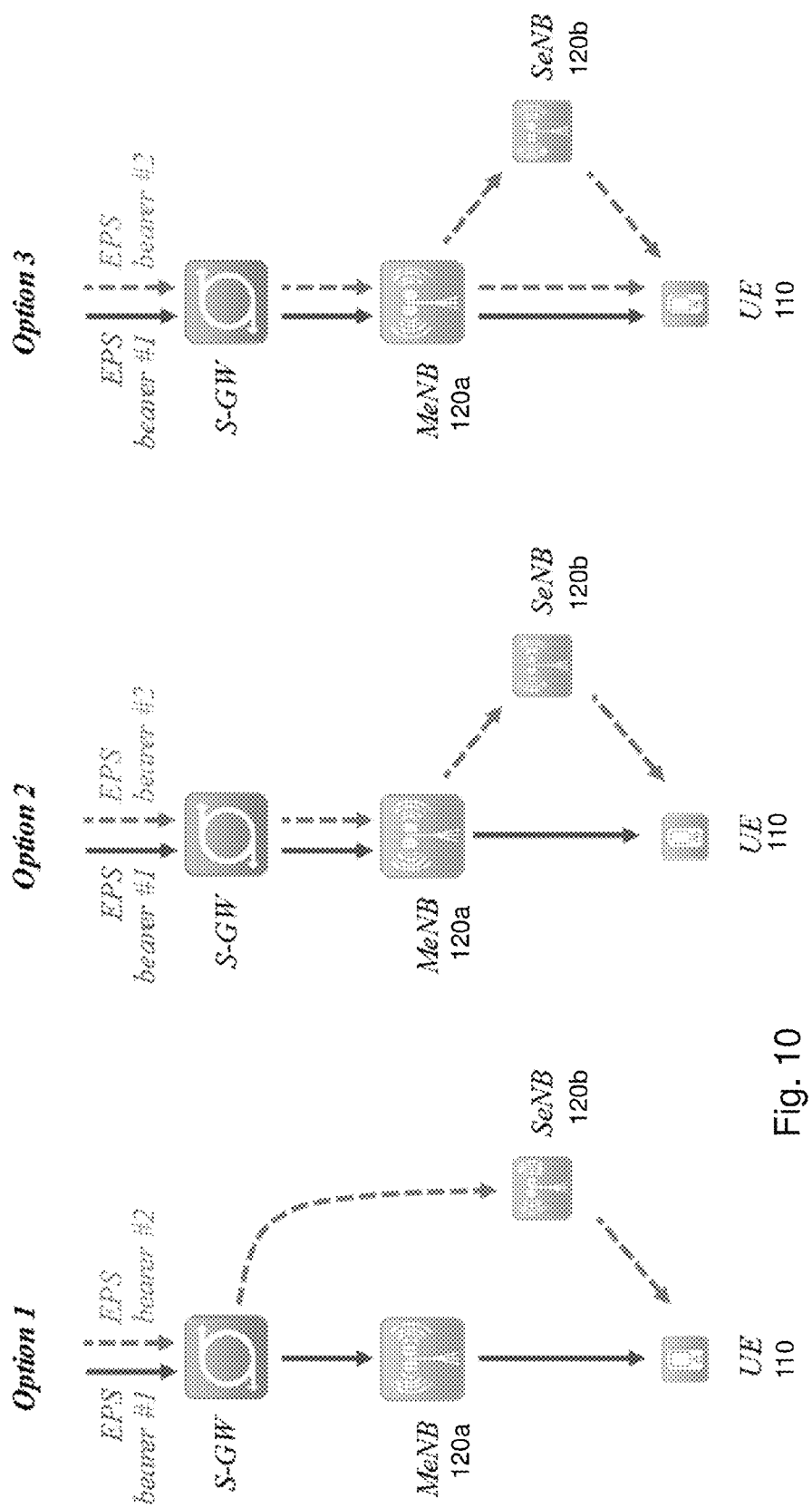
FIG. 10 illustrates three example options of splitting the user plane, according to some embodiments.

FIG. 10 illustrates three example options of splitting the user plane, according to some embodiments. Differentiating factors between the three options include the backhaul usage and the support for data split within or between EPS bearers. In Option 1, the S1-U terminates in SeNB 120*b*. In Option 2, the S1-U terminates in MeNB 120*a* and the bearer is not split in the RAN. In Option 3, the S1-U terminates in MeNB 120*a* and the bearer is split in the RAN.

Particular options may be better suited for particular embodiments. Given a non-ideal backhaul with limited capacity, Option 1 may avoid routing user plane data via MeNB 120*a* and thus avoid creating possible bottlenecks. Option 1 may achieve improved mobility robustness by separating control and user plane termination, but it implies signaling towards the core network for the path switch. This can be used to maintain a robust control plane connection with the macro layer, while offloading user plane traffic to the pico layer for improved throughput.

Furthermore, Option 1 may facilitate user plane aggregation. In particular embodiments, multi-path TCP (MPTCP) may split the data between the two EPS bearers. MPTCP aggregates a certain TCP connection over multiple paths. MPTCP includes one main flow and multiple subflows and is capable of distributing load on all interfaces. MPTCP is currently under standardization process within Internet Engineering Task Force (IETF). Because the connection multiplexing is on the TCP level, MPTCP facilitates separate congestion control for each subflow, overcoming the bottleneck problem of the first option discussed above. Though aggregation via MPTCP is applicable only for TCP based traffic, much of Internet/mobile broadband data is TCP based. In particular embodiments, MPTCP may be implemented in a MPTCP proxy, instead of end-to-end. For small object sizes, MPTCP benefits from parallel slow start phases.

In particular embodiments or deployments where backhaul capacity is not an issue, Option 3 may provide higher expected user resource aggregation gains through intra-bearer user plane aggregation because the splitting point is closer to the radio interface compared with Option 1. However, Option 3 uses L2 for splitting, flow control, and reordering. Option 2 is similar to option 3, but may not include user plane aggregation gains, although it assumes high backhaul capacity. Options 1 and 3 are currently within the scope of LTE Release 12.

Figure 11:
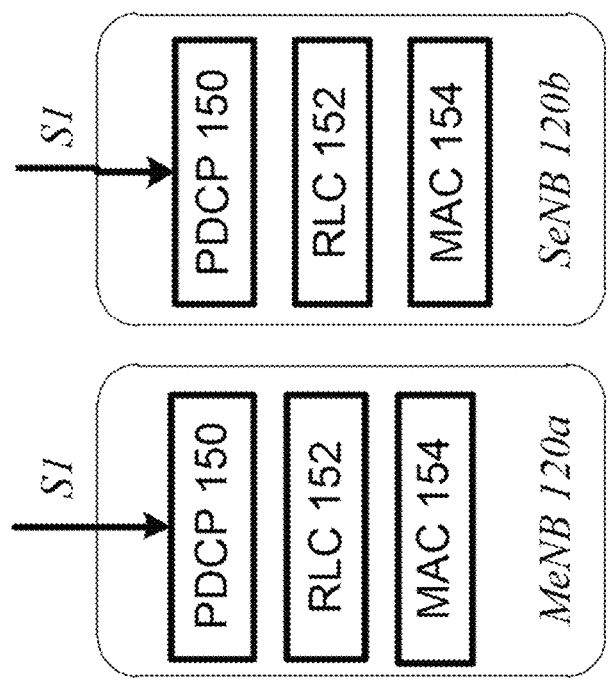
FIG. 11 illustrates an example of user plane protocol termination for bearer split at a network node, according to some embodiments.

For bearer split Option 1, the user plane protocol termination is shown in FIG. 11. FIG. 11 illustrates an example of user plane protocol termination for bearer split at a network node, according to some embodiments. Both MeNB 120a and SeNB 120b include PDCP module 150, RLC module 152, and MAC module 154. In particular embodiments, both MeNB 120a and SeNB 120b may include additional lower layer modules, such as a PHY module, and/or additional higher layer modules.

For bearer split Option 3, various protocol termination options are possible depending on where in the protocol stack the data is split. LTE Release 12 includes the example protocol split shown in FIG. 12A.

Figure 12B:
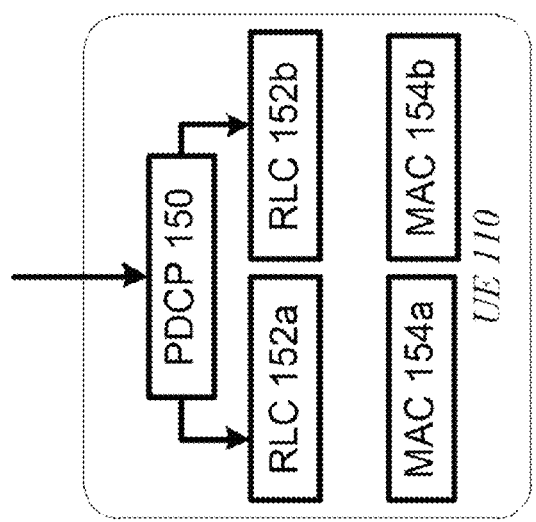
FIG. 12B illustrates an example of a user plane protocol architecture for bearer split at a wireless device, according to some embodiments.
Figure 12A:
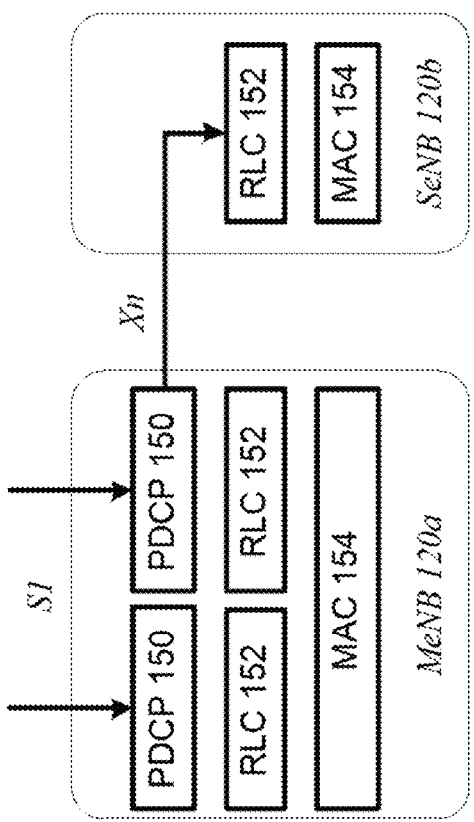
FIG. 12A illustrates another example of a user plane protocol architecture for bearer split at a network node, according to some embodiments.

FIG. 12A illustrates another example of a user plane protocol architecture for bearer split at a network node, according to some embodiments. MeNB 120a includes PDCP modules 150, RLC modules 152, and MAC module 154. SeNB 120b includes RLC module 152 and MAC module 154. As illustrated, multiple RLC 152 modules exist for the split bearer, two in MeNB 120a and one in SeNB 120b.

FIG. 12B illustrates an example of a user plane protocol architecture for bearer split at a wireless device, according to some embodiments. FIG. 12B illustrates the protocol stack for one split bearer. UE 110 includes PDCP module 150, RLC Modules 152a and 152b, and MAC modules 154a and 154b. As illustrated, UE 110 maintains two RLC modules 152 for the split bearer.

Figure 13:
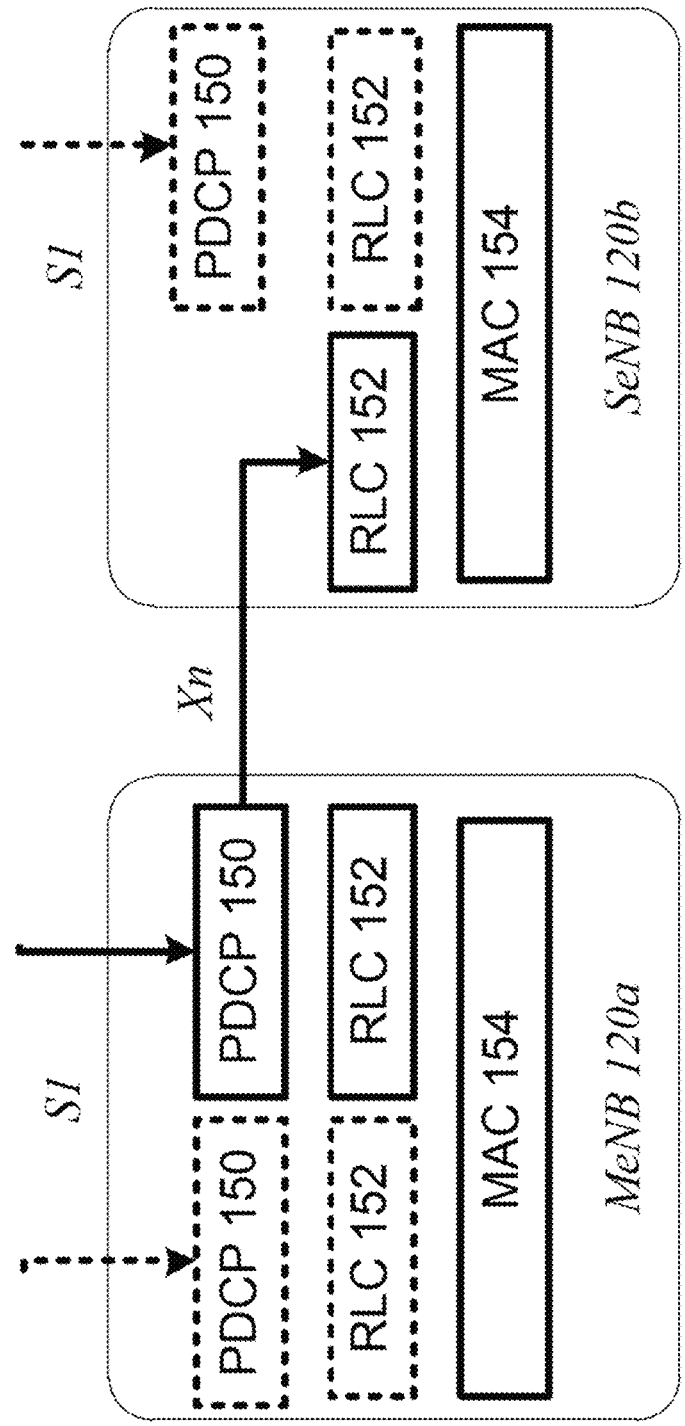
FIG. 13 illustrates an example of combined user plane architecture, according to some embodiments.

FIG. 13 illustrates an example of combined user plane architecture, according to some embodiments. In particular embodiments, the particular user plane architecture is a configuration option. Thus, FIG. 13 illustrates a common architecture with three types of bearers, rather than different architectures. MeNB 120a includes PDCP modules 150, RLC modules 152, and MAC module 154. SeNB 120b includes PDCP module 150, RLC modules 152, and MAC module 154.

The common user plane architecture comprises three bearer types and their termination points. The three bearer types include:

A Master Cell Group (MCG) Data Radio Bearer (DRB), which is a DRB for which resources are provided by the Master Cell Group only. The modules comprising an MCG DRB are illustrated by the dotted lines in MeNB 120a.

A Secondary Cell Group DRB (SCG DRB), which is a DRB for which resources are provided by the Secondary Cell Group only. The modules comprising the SCG DRB are illustrated by the dotted lines in SeNB 120b.

A split DRB, which is a DRB served by both MeNB 120a and SeNB 120b. The modules comprising the split DRB are illustrated by the solid lines in MeNB 120a and SeNB 120b.

To reduce complexity, LTE Release 12 may not support split uplink. In such a scenario, only one eNB may serve new PDCP data. Furthermore, new PDCP data may be reported to only one eNB, which may be configurable by the network.

For split bearers in particular embodiments, the network may configure, via RRC, the link over which a UE transmits uplink PDCP data. The UE may not report PDCP data as available to the other eNB. The limitation to report PDCP data to only one eNB can be captured either in the MAC specification or the PDCP specification.

Currently, the MAC layer accounts for available buffers in the RLC and PDCP layers when calculating a BSR. TS 36.321 specifies that the Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits. If extendedBSR-Sizes is not configured, the values taken by the Buffer Size field are shown in Table 6.1.3.1-1 of TS 36.321. If extendedBSR-Sizes is configured, the values taken by the Buffer Size field are shown in Table 6.1.3.1-2 of TS 36.321.

According to working group agreement, both BSRs and the transmission of uplink data may be limited to one eNB. This limitation is useful so that the uplink data does not accidentally go to the wrong eNB. A simple way to limit the transmission to one eNB is to provide a routing function in PDCP that only routes data to the one eNB that is configured with RRC. When the data is in the RLC and the MAC layer, there is no risk that the data will go to the wrong eNB.

In particular embodiments, the user plane architecture may include one or more of the following features. Both contention-free and contention-based radio access (RA) procedures may be supported towards the SeNB. Parallel RA procedures may be supported if RA Preamble transmissions do not overlap. Coordination of Physical Random Access Channel (PRACH) resources in the network side may not be required.

In particular embodiments, if a bearer is mapped into either MeNB or SeNB resources, then the UE may send BSR information for that bearer to the eNB which owns that bearer.

In particular embodiments, each eNB may have separate DRX configurations and operations (timers and active time).

In particular embodiments, activation and deactivation may be supported for SCG. MeNB can activate and deactivate Cells associated with MeNB. SeNB can activate and deactivate Cells associated with SeNB.

In particular embodiments, a UE may include two MAC entities in dual connectivity operation. The UE MAC entity is configured per Cell Group, i.e. one MAC is for communication with the MCG and the other MAC is for communication with the SCG.

In particular embodiments, flow control may be defined as an X2 user plane or an L2 user plane function.

The control plane architecture, illustrated above in FIG. 8, may be designed according to the following principles:

each eNB is able to handle UEs autonomously, i.e., provide the Primary Cell (PCell) to some UEs while acting as SeNB for others;

only one S1-MME Connection per UE;

each eNB operating in dual connectivity owns its radio resources, however, MeNB and SeNB will perform some coordination;

a UE stays in a single RRC state, i.e., either RRC_CONNECTED or RRC_IDLE.

A MeNB generates the final RRC messages to be sent towards a UE after the coordination of RRM functions between MeNB and SeNB. The UE RRC entity sees all messages as coming only from one entity (in the MeNB) and the UE only replies back to that entity.

Figure 14:
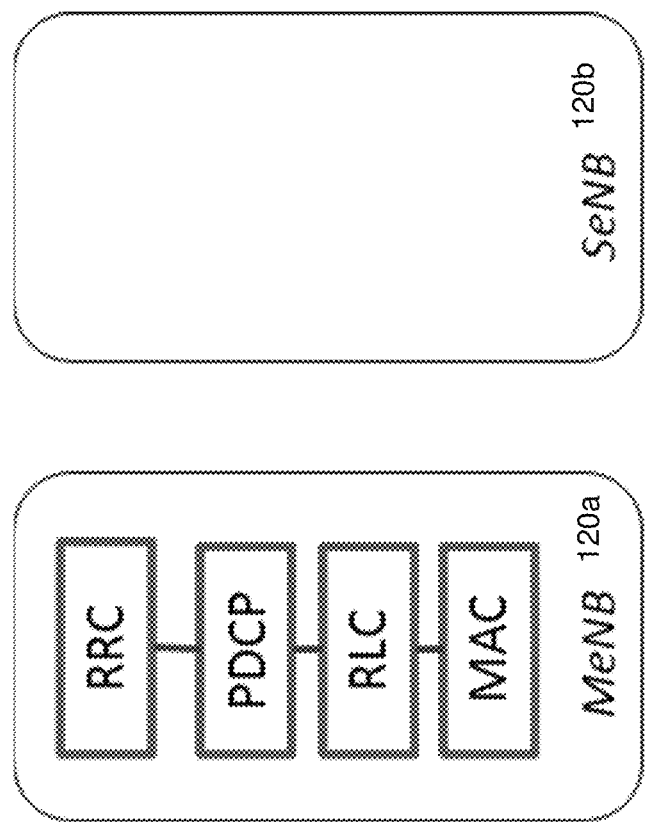
FIG. 14 illustrates an example L2 protocol control plane termination at a MeNB, according to some embodiments.

FIG. 14 illustrates an example L2 protocol control plane termination at a MeNB, according to some embodiments. MeNB 120a includes RRC, PDCP, RLC, and MAC modules. In LTE Release 12, L2 protocol termination for the control plane is made in MeNB. No enhancements to the L2 protocols are required with this approach.

As discussed above, in dual connectivity, the RRC protocol may be used to configure an eNB for which an uplink bearer's PDCP data is reported and transmitted. When a UE receives this configuration, it then reports PDCP towards a certain eNB and also transmits data towards that eNB.

The uplink for the split bearer may change regularly. In some cases, an uplink to a MeNB may be preferable to minimize latency. In other cases, an uplink to a SeNB may be preferable to minimize path loss between a UE and a base-station. Thus, procedures for reconfiguring an eNB used for the uplink of a split bearer are desirable.

At particular times, an uplink connection to a MeNB may be preferable to minimize latency whereas at other times an uplink connection to a SeNB may be preferable to minimize the path loss between a UE and a base-station. At particular times, a UE may stop uplink transmissions because of, for example, a radio link failure between the UE and the eNB. The uplink may be released, thus causing reconfiguration of the split bearer uplink.

In this disclosure, the term "old MAC" refers to a MAC entity through which uplink data was sent prior to an uplink rerouting. Similarly, the term "old eNB" refers to an eNB towards which uplink data was sent prior to the rerouting. The term "new MAC" refers to a MAC entity through which uplink transmissions are sent after the rerouting. Similarly, the term "new eNB" refers to an eNB to which the uplink data is sent after the rerouting.

Although a UE may be reconfigured to send uplink traffic from one eNB to another eNB, in particular embodiments these eNBs may be physically separated, or dual connectivity may be applied within a single eNB.

In particular embodiments, when an uplink direction changes, data may be pending in the PDCP and RLC buffers. In particular embodiments, it may be desirable that all transmissions towards an old eNB are stopped when the uplink is redirected towards a new eNB.

In particular embodiments, stopping all transmissions towards the old eNB may be achieved by resetting RLC and MAC layers for the split bearer in the UE when such reconfiguration occurs. Data in the PDCP layer may then be directed towards the new eNB.

After the uplink direction changes, the PDCP layer will stop directing data towards the old eNB, and instead direct the data towards the new eNB.

As a particular example, UE 110 illustrated in FIG. 12B may use PDCP 150, RLC 152a, and MAC 154a to transmit uplink data to a first network node, such as MeNB 120a illustrated in FIG. 12A. UE 110 may obtain an indication to switch transmission of uplink data to a second network node, such as SeNB 120b illustrated in FIG. 12A. UE 110 may reset RLC 152a and MAC 154a by clearing contents of buffers, stopping or restarting timers, zeroing counters, modifying state machines, or any other suitable operation or combination of operations. For example, UE 110 may clear data buffers and stop timers associated with RLC 152a and MAC 154a.

In particular embodiments, an RLC module may provide the contents of its data buffers to another layer before clearing its buffers. For example, RLC 152a may send the contents of a receive buffer to PDCP 150 before clearing the receive buffer. In particular embodiments, an RLC module may reset a subset of its buffers, timers, etc. For example, an RLC module or MAC module may reset its transmit buffers, but not reset its receive buffers.

UE 110 may then transmit uplink data to SeNB 120b using PDCP 150, RLC 152b, and MAC 154b. Additional embodiments are described below with reference to FIGS. 15-17.

Figure 15:
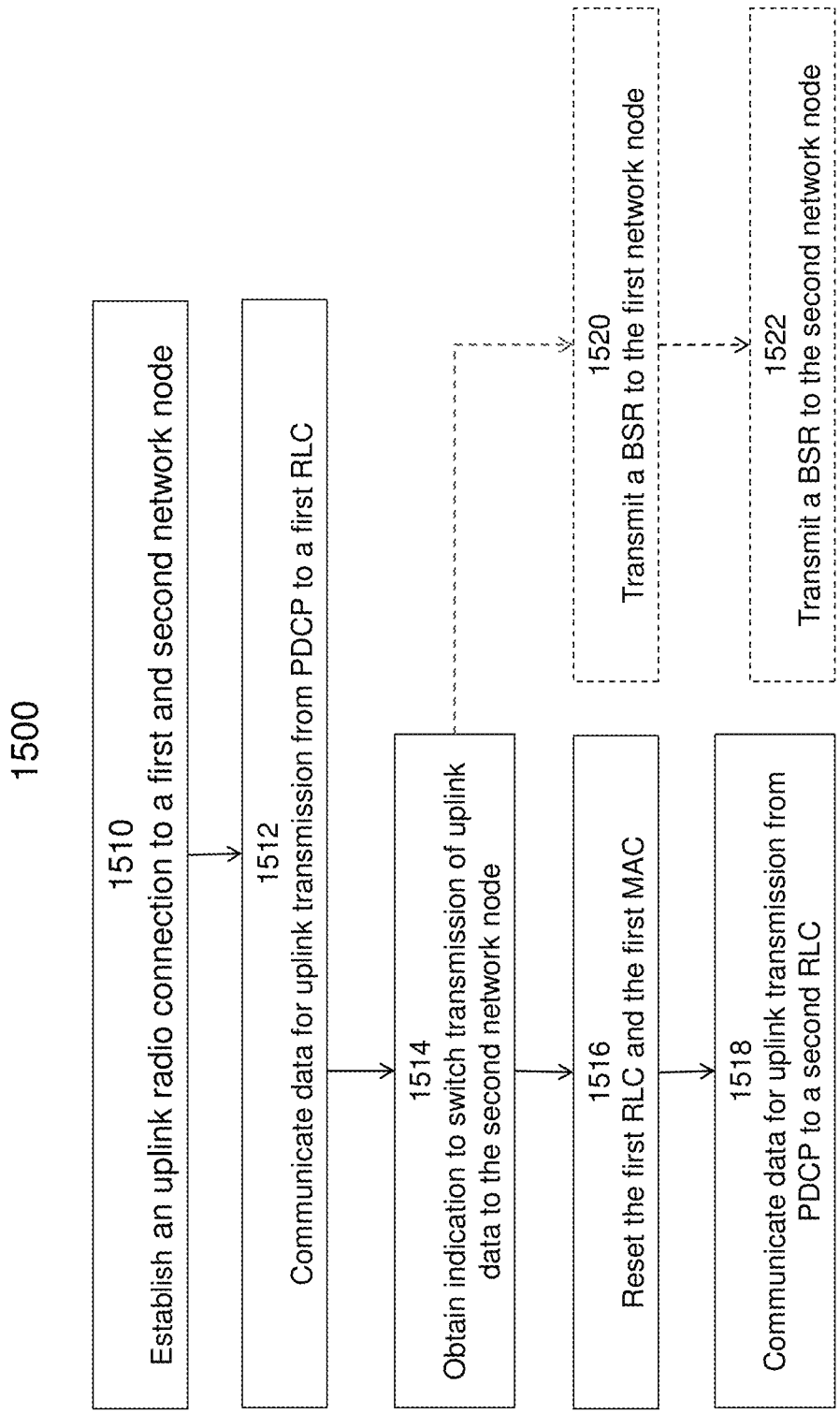
FIG. 15 is a flow diagram of an example method in a wireless device of switching transmission of uplink data from a first network node to a second network node, according to some embodiments.

FIG. 15 is a flow diagram of an example method in a wireless device of switching transmission of uplink data from a first network node to a second network node, according to some embodiments. In particular embodiments, one or more steps of method 1500 may be performed by components of wireless network 100 described with reference to FIGS. 1-14, 18 and 19.

At step 1510, a wireless device establishes an uplink connection to a first network node and a second network node. For example, wireless device 110 operating in dual connectivity may establish an uplink radio connection 135 to network node 120a (MeNB) and an uplink radio connection 135 to network node 120b (SeNB).

At step 1512, the wireless device communicates data for uplink transmission from its PDCP module to a first RLC module. For example, wireless device 110 may communicate data for uplink transmission from PDCP 150 to RLC 152a for eventual transmission to first network node 120a (MeNB).

At step 1514, the wireless device obtains an indication to switch transmission of uplink data to the second network node. For example, wireless device 110 may obtain an indication to switch transmission of uplink data from first network node 120a (MeNB) to second network node 120b (SeNB).

In particular embodiments, obtaining the indication to switch transmission of uplink data may comprise receiving an RRC message. In particular embodiments, the wireless device may autonomously obtain the indication to switch transmission of uplink data, such as by detecting a radio link failure or any other suitable condition.

At step 1516, the wireless device resets the first RLC module and the first MAC module. For example, wireless device 110 may reset RLC 152a and MAC 154a used for communication with network node 120a (MeNB).

In particular embodiments, the wireless device may reset the first RLC and first MAC module based on receiving the indication to switch transmission of uplink data. In other embodiments, the wireless device may receive an explicit indication or indications from a network node to reset an RLC module, a MAC module, or both.

In particular embodiments, resetting MAC and RLC modules may comprise resetting a state machine and flushing stored data associated with the uplink transmissions of these modules. A particular advantage is that downlink transmissions may continue without interruption. For example, an RLC module may flush stored data associated with an uplink transmission but provide stored data associated with a downlink transmission to a higher layer, such as the PDCP module.

In particular embodiments, resetting MAC and RLC modules may comprise selective reset. For example, only the old MAC and RLC modules (e.g., RLC 152a and MAC 154a) are reset, while the new MAC and RLC entities (e.g., RLC 152b and MAC 154b) are not reset. A particular advantage is that if there is any data in the buffers (or any ongoing procedures) in the new MAC and/or new RLC, then these buffers may remain untouched. Thus, user performance and system capacity may be improved because losses in user throughput, for example, may be avoided.

At step 1518, the wireless device communicates data for uplink transmission from the PDCP module to a second RLC module. For example, wireless device 110 may communicate data for uplink transmission from PDCP 150 to RLC 152b for eventual transmission to second network node 120b (SeNB).

Optionally, at step 1520, the wireless device may transmit a Buffer Status Report (BSR) to the first network node. For example, wireless device 110 may transmit a BSR to network node 120a (MeNB) upon obtaining the indication to switch transmission of uplink data to the second network node 120b (SeNB).

In particular embodiments, uplink reconfiguration may occur when a radio link of one of the connections in dual connectivity (e.g., the connection to the MeNB) fails. In this scenario, the MAC may be reset and the uplink of PDCP may be reconfigured.

In particular embodiments, during reconfiguration it may be useful to inform the old eNB that data that was earlier in the RLC and PDCP buffer is no longer available. This may be done by triggering a regular BSR when the reconfiguration occurs. Triggering the regular BSR may be achieved by adding a new trigger for BSR where the RRC layer would, upon uplink redirection, indicate to the MAC entities to send a BSR.

In particular embodiments, the new trigger may only trigger a BSR towards the old eNB, but not the new eNB. A BSR towards the new eNB may be triggered by some other procedure, e.g., when the data is delivered from PDCP to the RLC layer.

In particular embodiments, it may be useful to inform a new eNB that data that was earlier considered unavailable is now available. This may be done by triggering a regular BSR when the reconfiguration occurs.

At optional step 1522, the wireless device may transmit a BSR to the second network node. For example, wireless device 110 may transmit a BSR to network node 120b (SeNB) upon obtaining the indication to switch transmission of uplink data to the second network node 120b (SeNB).

In particular embodiments, a trigger for a new BSR may also be anchored in PDCP which may trigger the BSR when undergoing the uplink reconfiguration procedure. This procedure may be implicitly included in a procedure followed by PDCP after radio link failure (e.g., failure of the connection to the MeNB).

Alternatively, in particular embodiments, the PDCP layer may inform the MAC layer that data has become available as a result of the reconfiguration. In which case, new BSR triggers are not needed. The MAC layer may send regular BSRs according to the conventional operation of the PDCP, RLC, and MAC layers. For example, when new data for uplink transmission arrives at RLC 152b, MAC 154b may send a BSR to network node 120b (SeNB) indicating that data is available for transmission.

In particular embodiments, whether a UE shall perform BSR triggering upon reconfiguration may be configured by the network. The network may decide whether BSR should be triggered upon uplink rerouting. Whether this new BSR triggering should be applied may be preconfigured in a UE, e.g. specified in a specification. In particular embodiments, the network may indicate whether the new BSR triggering should be done in the RRC message used for triggering rerouting.

Modifications, additions, or omissions may be made to the steps illustrated in FIG. 15. Additionally, one or more steps may be performed in parallel or in any suitable order. For example, triggering of a BSR may occur at an RRC module upon receiving an indication to switch transmission of uplink data, or may be determined by a PDCP module, or both. As another example, although particular example steps above describe switching from a MeNB to a SeNB, the same steps may also switch from a SeNB to a MeNB.

In another embodiment, when reconfiguration of an uplink occurs, RLC data may be kept in a corresponding RLC buffer related to the old eNB and only PDCP routing and buffer status reporting may be changed when reconfiguration occurs. Parallel transmissions to both eNBs may occur over a transient period. In this transient period, data remaining in the RLC transmission buffer related the old MAC may still be sent and reported by regular BSR until the buffer is empty.

Figure 16:
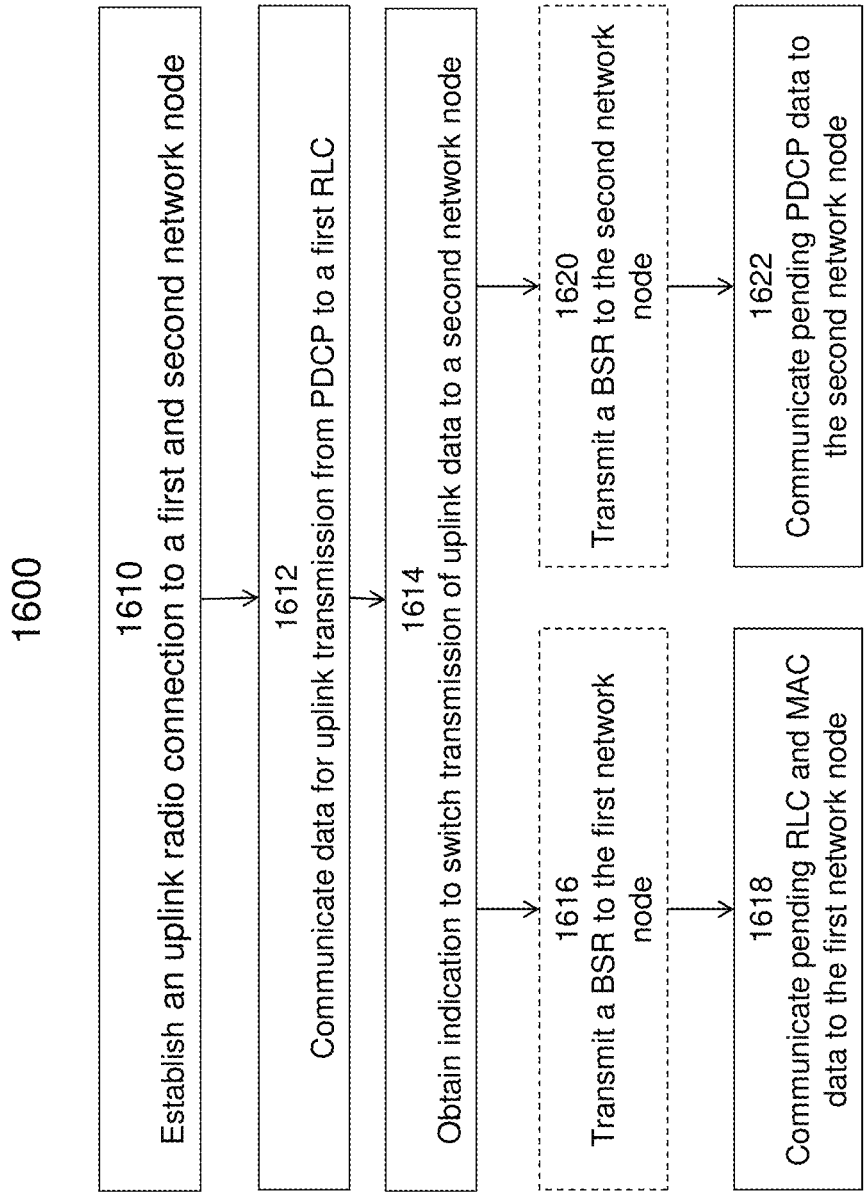
FIG. 16 is a flow diagram of another example method in a wireless device of switching transmission of uplink data from a first network node to a second network node, according to some embodiments.

FIG. 16 is a flow diagram of another example method in a wireless device of switching transmission of uplink data from a first network node to a second network node, according to some embodiments. In particular embodiments, one or more steps of method 1600 may be performed by components of wireless network 100 described with reference to FIGS. 1-14, 18 and 19.

At step 1610, a wireless device establishes an uplink connection to a first network node and a second network node. For example, wireless device 110 operating in dual connectivity may establish an uplink radio connection 135 to network node 120a (MeNB) and an uplink radio connection 135 to network node 120b (SeNB).

At step 1612, the wireless device communicates data for uplink transmission from its PDCP module to a first RLC module. For example, wireless device 110 may communicate data for uplink transmission from PDCP 150 to RLC 152a for eventual transmission to first network node 120a (MeNB).

At step 1614, the wireless device obtains an indication to switch transmission of uplink data to the second network node. For example, wireless device 110 may obtain an indication to switch transmission of uplink data from first network node 120a (MeNB) to second network node 120b (SeNB).

In particular embodiments, obtaining the indication to switch transmission of uplink data may comprise receiving an RRC message. In particular embodiments, the wireless device may autonomously obtain the indication to switch transmission of uplink data, such as by detecting a radio link failure or any other suitable condition.

At optional step 1616, the wireless device transmits a BSR to the first network node. For example, wireless device 110 may transmit a BSR to network node 120a (MeNB) indicating that data available at RLC 152a and MAC 154a at the time of obtaining the indication to switch transmission of uplink data is still available for transmission to network node 120a (MeNB). In particular embodiments, the wireless device may not transmit a BSR to the first network node and continue to step 1618.

At step 1618, the wireless device communicates pending RLC and MAC data to the first network node. For example, wireless device 110 may communicate data pending in RLC 152a and MAC 154b to network node 120a (MeNB).

At optional step 1620, the wireless device transmits a BSR to the second network node. For example, wireless device 100 may transmit a BSR to network node 120b (SeNB) indicating that data available at PDCP 150 at the time of obtaining the indication to switch transmission of uplink data is available for transmission to network node 120b (SeNB). In particular embodiments, the wireless device may not transmit a BSR to the second network node and continue to step 1622.

At step 1622, the wireless device communicates pending PDCP data to the second network node. For example, wireless device 110 may communicate the data pending in PDCP 150 to network node 120b (SeNB). In particular embodiments, any subsequent data arriving at PDCP 150 is transmitted through RLC 152b and MAC 154b for communication to network node 120b (SeNB) until another indication to switch transmission of uplink data is obtained by wireless device 110.

In particular embodiments, it may be useful to inform one or both eNBs about the buffer status situation. For example, wireless device 110 may perform step 1620 to send a BSR to second network node 120b, or wireless device may perform steps 1616 and 1620 to send a BSR to both network nodes 120.

Because RLC data is kept in the buffers, new information about RLC data is not needed for corresponding buffer status reports. However, BSRs sent to the old eNB should no longer consider the data in the PDCP buffer because that data is signaled towards the new eNB from the time of the rerouting.

In particular embodiments, PDCP data that is already in the buffer may be reported towards a new eNB. For the old eNB, a UE may have earlier reported data to the old eNB and it may be useful to notify the old eNB that there is no data in the buffer anymore.

In particular embodiments, a rule for BSR reporting when the uplink for the split bearer is reconfigured from one eNB to another eNB may include explicitly triggering a BSR. In particular embodiments, data that was earlier considered relevant data for an old eNB but is now mapped towards a new eNB may be considered as new data towards the new eNB. Thus, a BSR may be triggered because this may be treated as the arrival of data to an empty buffer. For example, in the current MAC specification TS 36.321, the following condition triggers a BSR: uplink data, for a logical channel which belongs to a LCG, becomes available for transmission in the RLC entity or in the PDCP entity (the definition of what data shall be considered as available for transmission is specified in TS 36.322 and TS 36.323) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR."

In particular embodiments, a rule may define whether PDCP PDUs that have been sent via an old RLC/MAC but for which delivery had not yet been indicated to PDCP may be reported (and sent) as new data to a new RLC/MAC.

In particular embodiments, a further trigger for a BSR via a new MAC may be in PDCP when PDCP receives an indication of successful delivery of a PDU via an old RLC/MAC.

Modifications, additions, or omissions may be made to the steps illustrated in FIG. 16. Additionally, one or more steps may be performed in parallel (e.g., steps 1616-1618 and steps 1620-1622) or in any suitable order.

Figure 17:
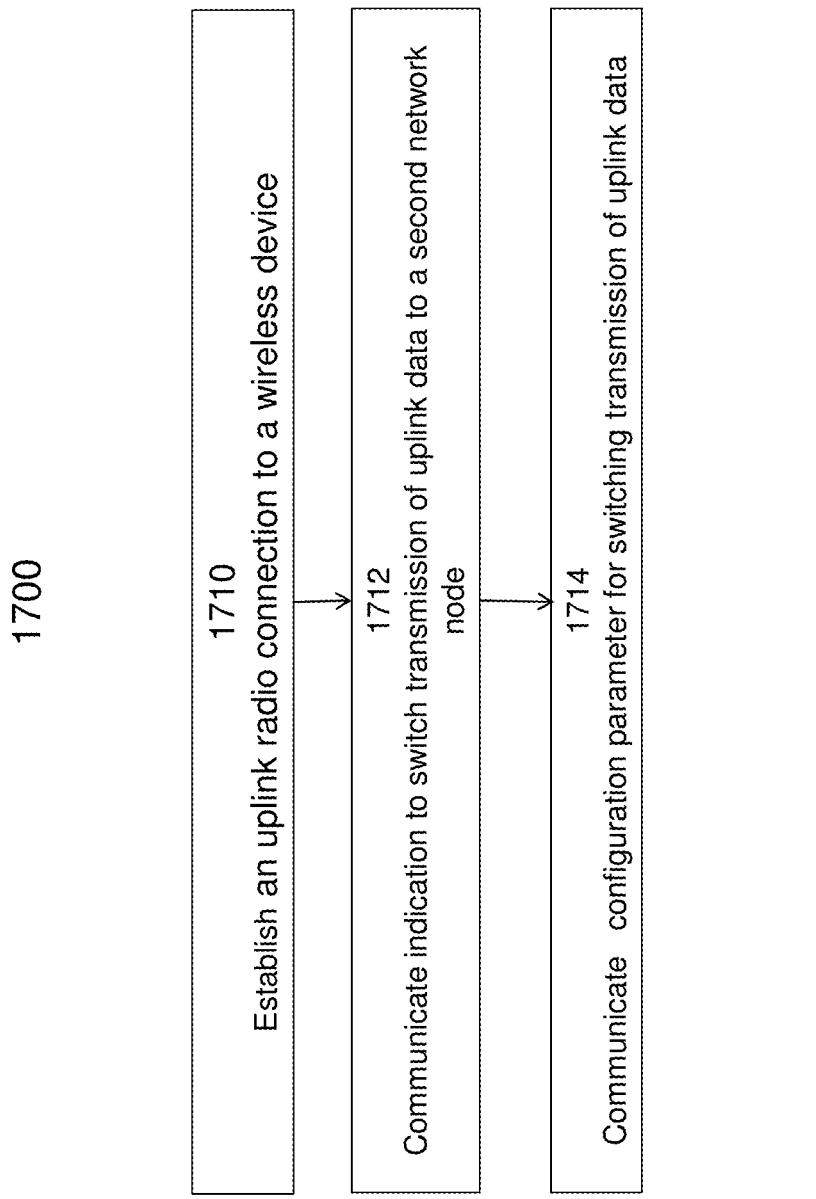
FIG. 17 is a flow diagram of an example method in a network node of communicating an indication to a wireless device to switch transmission of uplink data from the first network node to a second network node, according to some embodiments.

FIG. 17 is a flow diagram of an example method in a network node of communicating an indication to a wireless device to switch transmission of uplink data from the first network node to a second network node, according to some embodiments. In particular embodiments, one or more steps of method 1700 may be performed by components of wireless network 100 described with reference to FIGS. 1-14, 18 and 19.

At step 1710, a network node establishes an uplink radio connection with a wireless device. For example, wireless device 110 operating in dual connectivity may establish an uplink radio connection 135 with network node 120a (MeNB). Wireless device 110 may also establish an uplink radio connection 135 with network node 120b (SeNB).

At step 1712, the network node communicates an indication to the wireless device to switch transmission of uplink data from the first network node to a second network node. For example, network node 120a (MeNB) may communicate an indication to wireless device 110 for wireless device 110 to switch transmission of uplink data from network node 120a (MeNB) to network node 120b (SeNB). In particular embodiments, the communication may comprise transmitting an RRC message to wireless device 110.

At step 1714, the network node communicates a configuration parameter to the wireless device for switching transmission of uplink data. For example, network node 120a (MeNB) may communicate a configuration parameter to wireless device 110.

In particular embodiments, the configuration parameter may comprise an indication of whether the wireless device should reset its RLC and/or MAC modules, an indication of whether the wireless device should transmit regular BSRs or new BSRs, or any suitable combination of configuration parameters. In particular embodiments, the indication to switch transmission of uplink data and the configuration parameter may be included in the same communication.

In particular embodiments, the network node may communicate other indications to the wireless device using similar steps. Other indications may include indications for the wireless device to reset its RLC and/or MAC modules. For example, in some embodiments a wireless device may automatically reset its RLC and/or MAC modules upon receiving an indication to switch transmission of uplink data. In other embodiments, a wireless device may not reset its RLC and/or MAC modules until receiving an indication from the network node.

Modifications, additions, or omissions may be made to the steps illustrated in FIG. 17. Additionally, one or more steps may be performed in parallel or in any suitable order.

FIG. 18 is a block diagram illustrating an example embodiment of a wireless device. The wireless device is an example of wireless device 110 illustrated in FIG. 8 and others. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other user equipment or device that can provide wireless communication. The wireless device includes transceiver 1810, processor 1820, and memory 1830. In some embodiments, transceiver 1810 facilitates transmitting wireless signals to and receiving wireless signals from wireless network node 120 (e.g., via an antenna), processor 1820 executes instructions to provide some or all of the functionality described herein as provided by the wireless device, and memory 1830 stores the instructions executed by processor 1820.

Processor 1820 includes any suitable combination of hardware and software implemented in one or more integrated circuits or modules to execute instructions and manipulate data to perform some or all of the described functions of the wireless device. In some embodiments, processor 1820 may include, for example, one or more computers, one more programmable logic devices, one or more central processing units (CPUs), one or more microprocessors, one or more applications, and/or other logic, and/or any suitable combination of the preceding. Processor 1820 may include analog and/or digital circuitry configured to perform some or all of the described functions of wireless device 110. For example, processor 1820 may include resistors, capacitors, inductors, transistors, diodes, and/or any other suitable circuit components.

Memory 1830 is generally operable to store computer executable code and data. Examples of memory 1830 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 1820 in communication with transceiver 1810 transmits both uplink and downlink radio signal to network node 120. Other embodiments of the wireless device may include additional components (beyond those shown in FIG. 18) responsible for providing certain aspects of the wireless device's functionality, including any of the functionality described above and/or any additional functionality (including any functionality necessary to support the solution described above).

FIG. 19 is a block diagram illustrating an example embodiment of a network node. Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 1910, at least one processor 1920, at least one memory 1930, and at least one network interface 1940. Transceiver 1910 facilitates transmitting wireless signals to and receiving wireless signals from a wireless device, such as wireless devices 110 (e.g., via an antenna); processor 1920 executes instructions to provide some or all of the functionality described above as being provided by a network node 120; memory 1930 stores the instructions executed by processor 1920; and network interface 1940 communicates signals to backend network components, such as a gateway, switch, router, Internet, Public Switched Telephone Network (PSTN), controller, and/or other network nodes 120. Processor 1920 and memory 1930 can be of the same types as described with respect to processor 1820 and memory 1830 of FIG. 18 above.

In some embodiments, network interface 1940 is communicatively coupled to processor 1920 and refers to any suitable device operable to receive input for network node 120, send output from network node 120, perform suitable processing of the input or output or both, communicate to other devices, or any combination of the preceding. Network interface 1940 includes appropriate hardware (e.g., port, modem, network interface card, etc.) and software, including protocol conversion and data processing capabilities, to communicate through a network.

In particular embodiments, processor 1920 in communication with transceiver 1910 transmits/receives wireless signals, including uplink and downlink signals and control information, to/from wireless device 110. In particular embodiments, processor 1920 in communication with transceiver 1910 transmits uplink and downlink signals as described above to wireless device 110.

Other embodiments of network node 120 include additional components (beyond those shown in FIG. 19) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Some embodiments of the disclosure may provide one or more technical advantages. As an example, particular embodiments may facilitate efficiently switching split bearer uplinks between network nodes to take advantage of different network conditions. Efficient switching may be facilitated by triggering BSRs. Particular embodiments permit uplink data to be transmitted towards only a single network node at any one time.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

It will be appreciated by the person of skill in the art that various modifications may be made to the above described embodiments without departing from the scope of the present invention. For example, although embodiments of the present invention have been described with examples that include a communication system compliant to the 3GPP specified LTE standard specification, it should be noted that the solutions presented may be equally well applicable to other networks that support dual connectivity. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

Although the preceding embodiments have been described for example purposes, it will be appreciated that other example embodiments include variations of and extensions to these enumerated examples, in accordance with the detailed procedures and variants described above.

In the above-description, the terminology used is for the purpose of describing particular embodiments only and is not intended to be limiting. Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, some embodiments may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the disclosure. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present disclosure. All such variations and modifications are intended to be included herein within the scope of present disclosure. Accordingly, the above disclosed subject matter is to be considered illustrative, and not restrictive, and the appended examples of embodiments are intended to cover all such modifications, enhancements, and other embodiments, which fall within the spirit and scope of present disclosure. Thus, the scope of present disclosure are to be determined by the broadest permissible interpretation of the present disclosure, and shall not be restricted or limited by the foregoing detailed description.

Abbreviations Used in the Preceding Description Include

3GPP Third Generation Partnership Project
BCH Broadcast Channel
BS Base Station
BSC Base Station Controller
BSR Buffer Status Report
CDMA2000 Code division multiple access 2000

CRS Cell-Specific Reference Signal
DRB Data Radio Bearer
eNB Evolved Node B, base station
EPC Evolved Packet Core
EPS Evolved Packet System
E-UTRAN Evolved Universal Terrestrial Radio Access Network
FDD Frequency Division Duplex
GSM Global System for Mobile communication
HeNB Home Evolved Node B, or Home base station
HO Handover
HSPA High Speed Packet Access
IETF Internet Engineering Task Force
LPN Low Power Node
LTE Long Term Evolution
M2M Machine-To-Machine
MAC Medium Access Control
MBS Macro Base Station
MCG Master Cell Group
MeNB Master eNB
MIMO Multiple-Input Multiple-Output
MME Mobility Management Entity
MTC Machine-Type Communication
MPTCP Multi-Path TCP
NAS Non Access Stratum
PBCH Physical Broadcast Channel
PCell Primary Cell
PCFICH Physical Control Format Indicator
PCI Physical cell identity
PDCCH Physical Downlink Control Channel
PDCP Packet Data Convergence Protocol
PDN Packet Data Network
PDSCH Physical Downlink Shared Channel
PDU Protocol Data Unit
P-GW Packet Data Network Gateway
PHICH Physical Hybrid ARQ Indicator Channel
PSS Primary Synchronization Signal
PSTN Public Switched Telephone Network
QoS Quality of Service
RA Random Access
RAB Radio Access Bearer
RAN Radio Access Network
RLC Radio Link Control
RNC Radio Network Controller
ROHC Robust Header Compression
RRC Radio Resource Control
RRH Remote Radio Head
RRM Radio Resource Management
RS Reference Signal
SCG Secondary Cell Group
SDF Service Data Flow
SDU Service Data Unit
SeNB Secondary eNB
SFN Single Frequency Network
S-GW Serving Gateway
SINR Signal-to-Interference Ratio
SRB Signaling Radio Bearer
TTI Transmission Time Interval
UE User Equipment
UL Uplink
UMB Ultra Mobile Broadband
UMTS Universal Mobile Telecommunications System
WCDMA Wideband Code Division Multiple Access
WiMAX Worldwide Interoperability for Microwave Access

The invention claimed is:

1. A method in a wireless device operating in dual connectivity with a first network node and a second network node, the method comprising:
    establishing an uplink radio connection from the wireless device to the first network node and to the second network node, the wireless device comprising a first Medium Access Control (MAC) module and a first Radio Link Control (RLC) module for uplink radio communication with the first network node, a second MAC module and a second RLC module for uplink radio communication with the second network node, and a Packet Data Convergence Protocol (PDCP) module for communicating with the first RLC module and the second RLC module;
    communicating data for uplink transmission from the PDCP module to the first RLC module;
    obtaining an indication to switch transmission of uplink data from the first network node to the second network node;
    resetting the first RLC module and the first MAC module; and
    communicating data for uplink transmission from the PDCP module to the second RLC module.

2. The method of claim 1, wherein obtaining the indication to switch transmission of uplink data from the first network node to the second network node comprises receiving a Radio Resource Control (RRC) message.

3. The method of claim 1, further comprising transmitting a Buffer Status Report (BSR).

4. The method of claim 3, wherein the obtaining the indication to switch transmission of uplink data from the first network node to the second network node triggers the transmitting the BSR.

5. The method of claim 3, wherein the PDCP module triggers the transmitting the BSR.

6. The method of claim 3, wherein transmitting the BSR comprises transmitting a first BSR to the first network node, the first BSR indicating that the wireless device does not have data for uplink transmission to the first network node.

7. The method of claim 3, wherein transmitting the BSR comprises transmitting a second BSR to the second network node, the second BSR indicating that the wireless device has data for uplink transmission to the second network node.

8. The method of claim 1, wherein resetting the RLC module comprises resetting an uplink buffer of the RLC module.

9. The method of claim 1, further comprising obtaining an indication to reset the first RLC module or the first MAC module.

10. A method in a wireless device, the wireless device operating in dual connectivity with a first network node and a second network node, the method comprising:
    establishing an uplink radio connection from the wireless device to the first network node and to the second network node, the wireless device comprising a first Medium Access Control (MAC) module and a first Radio Link Control (RLC) module for uplink radio communication with the first network node, a second MAC module and a second RLC module for uplink radio communication with the second network node, and a Packet Data Convergence Protocol (PDCP) module for communicating with the first RLC module and the second RLC module;
    communicating data for uplink transmission from the PDCP module to the first RLC module;

obtaining an indication to switch transmission of uplink data from the first network node to the second network node;

communicating data pending for uplink transmission in the first RLC module and the first MAC module to the first network node; and communicating data pending for uplink transmission in the PDCP module to the second network node.

11. The method of claim 10, further comprising transmitting a Buffer Status Report (BSR) to the first network node, the BSR indicating data pending for uplink transmission in the first RLC module and the first MAC module at a time when the wireless device obtains the indication to switch transmission of uplink data.

12. The method of claim 10, further comprising transmitting a BSR to the second network node, the BSR indicating data pending for uplink transmission in the PDCP module at a time when the wireless device obtains the indication to switch transmission of uplink data.

13. The method of claim 10, wherein obtaining the indication to switch transmission of uplink data from the first network node to the second network node comprises receiving a Radio Resource Control (RRC) message.

14. A method in a first network node, the first network node operating in dual connectivity with a wireless device and a second network node, the method comprising:

establishing an uplink radio connection from the wireless device to the first network node and to the second network node, the wireless device comprising a first Medium Access Control (MAC) module and a first Radio Link Control (RLC) module for uplink radio communication with the first network node, a second MAC module and a second RLC module for uplink radio communication with the second network node, and a Packet Data Convergence Protocol (PDCP) module for communicating with the first RLC module and the second RLC module;

communicating, to the wireless device, an indication to switch transmission of uplink data, via the PDCP module, from the first network node to the second network node; and communicating, to the wireless device, a configuration parameter for switching transmission of uplink data, via the PDCP module, from the first network node to the second network node.

15. The method of claim 14, wherein the configuration parameter comprises an indication for the wireless device to reset the first MAC module and the first RLC module.

16. The method of claim 14, wherein the configuration parameter comprises an indication for the wireless device to send a Buffer Status Report (BSR).

17. A wireless device configured to operate in dual connectivity with a first network node and a second network node, the wireless device comprising:

one or more processors comprising:
a first Medium Access Control (MAC) module and a first Radio Link Control (RLC) module for uplink radio communication with the first network node;
a second MAC module and a second RLC module for uplink radio communication with the second network node; and
a Packet Data Convergence Protocol (PDCP) module for communicating with the first RLC module and the second RLC module; and at least one memory, the memory containing instructions executable by the one or more processors whereby the wireless device is operable to:

establish an uplink radio connection from the wireless device to the first network node and to the second network node;
communicate data for uplink transmission from the PDCP module to the first RLC module;
obtain an indication to switch transmission of uplink data from the first network node to the second network node;
reset the first RLC module and the first MAC module; and
communicate data for uplink transmission from the PDCP module to the second RLC module.

18. The wireless device of claim 17, wherein the wireless device is operable to obtain the indication to switch transmission of uplink data from the first network node to the second network node by receiving a Radio Resource Control (RRC) message.

19. The wireless device of claim 17, wherein the wireless device is operable to transmit a Buffer Status Report (BSR).

20. The wireless device of claim 19, wherein obtaining the indication to switch transmission of uplink data from the first network node to the second network node triggers the wireless device to transmit the BSR.

21. The wireless device of claim 19, wherein the PDCP module triggers the wireless device to transmit the BSR.

22. The wireless device of claim 19, wherein the BSR is transmitted to the first network node, the BSR indicating that the wireless device does not have data for uplink transmission to the first network node.

23. The wireless device of claim 19, wherein the BSR is transmitted to the second network node, the BSR indicating that the wireless device has data for uplink transmission to the second network node.

24. The wireless device of claim 17, wherein the wireless device is operable to reset an uplink buffer of the RLC module.

25. The wireless device of claim 17, wherein the wireless device is operable to obtain an indication to reset the first RLC module or the first MAC module.

26. A wireless device configured to operate in dual connectivity with a first network node and a second network node, the wireless device comprising:

one or more processors comprising:
a first Medium Access Control (MAC) module and a first Radio Link Control (RLC) module for uplink radio communication with the first network node;
a second MAC module and a second RLC module for uplink radio communication with the second network node; and
a Packet Data Convergence Protocol (PDCP) module for communicating with the first RLC module and the second RLC module; and at least one memory, the memory containing instructions executable by the one or more processors whereby the wireless device is operable to:

establish an uplink radio connection from the wireless device to the first network node and to the second network node;
communicate data for uplink transmission from the PDCP module to the first RLC module;
obtain an indication to switch transmission of uplink data from the first network node to the second network node;
communicate data pending for uplink transmission in the first RLC module and the first MAC module to the first network node; and communicate data pending for uplink transmission in the PDCP module to the second network node.

27. The wireless device of claim 26, wherein the wireless device is operable to transmit a Buffer Status Report (BSR) to the first network node, the BSR indicating data pending for uplink transmission in the first RLC module and the first MAC module at a time when the wireless device obtains the indication to switch transmission of uplink data.

28. The wireless device of claim 26, wherein the wireless device is operable to transmit a BSR to the second network node, the BSR indicating data pending for uplink transmission in the PDCP module at a time when the wireless device obtains the indication to switch transmission of uplink data.

29. The wireless device of claim 26, wherein the wireless device is operable to obtain the indication to switch transmission of uplink data from the first network node to the second network node by receiving a Radio Resource Control (RRC) message.

30. A network node configured to operate in dual connectivity with a wireless device and a second network node, the network node comprising:

one or more processors; and at least one memory, the memory containing instructions executable by the one or more processors whereby the network node is operable to:

establish an uplink radio connection from the wireless device to the first network node and to the second network node;

communicate, to the wireless device, an indication to switch transmission of uplink data, via the PDCP module, from the first network node to the second network node; and communicate, to the wireless device, a configuration parameter for switching the uplink radio connection.

31. The network node of claim 30, wherein the configuration parameter comprises an indication for the wireless device to reset a first MAC module and a first RLC module of the wireless device.

32. The network node of claim 30, wherein the configuration parameter comprises an indication for the wireless device to send a Buffer Status Report (BSR).

* * * * *